(12) United States Patent
Mestha et al.

(10) Patent No.: US 8,488,192 B2
(45) Date of Patent: Jul. 16, 2013

(54) METHOD FOR MAPPING AN OUT-OF-GAMUT COLOR USING A REFERENCE GAMUT MAPPING

(75) Inventors: Lalit Keshav Mestha, Fairport, NY (US); Prudhvi Krishna Gurram, Silver Spring, MD (US)

(73) Assignee: Xerox Corporation, Norwalk, CT (US)

( * ) Notice: Subject to any disclaimer, the term of this patent is extended or adjusted under 35 U.S.C. 154(b) by 703 days.

(21) Appl. No.: 12/769,811

(22) Filed: Apr. 29, 2010

(65) Prior Publication Data

US 2011/0267630 A1 Nov. 3, 2011

(51) Int. Cl.
*G06F 15/00* (2006.01)

(52) U.S. Cl.
USPC ............................ 358/1.9; 358/1.1; 382/167

(58) Field of Classification Search
USPC ............................ 358/1.19, 1.9, 1.1; 382/167
See application file for complete search history.

(56) References Cited

U.S. PATENT DOCUMENTS

| | | | |
|---|---|---|---|
| 5,483,360 A | 1/1996 | Rolleston et al. | |
| 5,734,802 A | 3/1998 | Maltz et al. | |
| 6,157,469 A | 12/2000 | Mestha | |
| 6,636,628 B1 * | 10/2003 | Wang et al. | 382/167 |
| 6,744,531 B1 | 6/2004 | Mestha et al. | |
| 7,397,581 B2 | 7/2008 | Mestha et al. | |
| 2008/0043263 A1 | 2/2008 | Hancock et al. | |
| 2008/0043264 A1 | 2/2008 | Gil et al. | |
| 2008/0252931 A1 | 10/2008 | Mestha et al. | |
| 2008/0253649 A1 | 10/2008 | Wang et al. | |
| 2009/0161125 A1 * | 6/2009 | Mestha et al. | 358/1.9 |
| 2009/0296107 A1 | 12/2009 | Mestha et al. | |
| 2010/0020106 A1 | 1/2010 | Gil et al. | |

OTHER PUBLICATIONS

U.S. Appl. No. 12/127,643, filed May 27, 2008, Mestha et al.
U.S. Appl. No. 12/391,473, filed Jul. 22, 2008, Gil et al.
U.S. Appl. No. 12/391,504, filed Feb. 24, 2009, Mestha et al.
U.S. Appl. No. 12/391,529, filed Feb. 24, 2009, Mestha et al.
U.S. Appl. No. 12/630,093, filed Oct. 30, 2009, Mestha et al.
GJ Braun and MD Fairchild. Techniques for Gamut Surface Definition and Visualization. IS&T/SID. p. 147-152. Scottsdale, AZ. 1997.
ED Montag and MD Fairchild. Gamut Mapping: Evaluation of Chroma Clipping Techniques for Three Destination Gamuts. IS&T/SID Sixth Colour Imaging Conference. Scottsdale, AZ. p. 57-61. 1998.

(Continued)

*Primary Examiner* — Benny Q Tieu
*Assistant Examiner* — Martin Mushambo
(74) *Attorney, Agent, or Firm* — Philip E. Blair; Fleit Gibbons Gutman Bongini & Bianco P.L.

(57) ABSTRACT

What is disclosed is a novel system and method for retrieving a gamut mapping strategy from a seed profile of a seed device. In a manner more fully described herein, the present method provides an embodiment which accounts for the pathological case of a false gamut mapping ray being produced in those instances where the shapes of the gamuts of the host and seed devices are substantially different. In these instances, the rays miss the boundary surface of the host gamut and intersect the boundary of the L*a*b* cube. Another embodiment is provided which accounts for those cases wherein the ray intersects the host gamut at a substantially oblique angle such that mapped color is sufficiently different to generate contours in the output print.

16 Claims, 15 Drawing Sheets

OTHER PUBLICATIONS

TJ Cholewo and L Shaun. Gamut Boundary Determinatin Using Alpha-Shapes. Proceedings of the Seventh IS&T/SID Colour Imaging Conference on Color Science, Systems, and Applications. Scottsdale, AZ. 1999.

KM Braun and R Balasubramanian and R Eschbach. Development and Evaluation of the Six Gamut-Mapping Algorithms for Pictorial Images. Proceedings of the Seventh Color Imaging Conference. Scottsdale, AZ. p. 144-148. 1999.

Sohil A Dianat and Lalit K Mestha and Daniel E Vassolo and Yao R Wang. Practical Algorithm for the Inversion of an Expermental Input-Output Color Map for Color Correction. International Society for Optical Engineering vol. 42 No. 3. Mar. 23, 2003.

Using the sRGB_v4_ICC_Preference.icc profile. International Color Consortium. 2004.

P Zolliker and K Simon. Continuity of Gamut Mapping Algorithms. J Electron Image vol. 15 No. 1. p. 13004. Mar. 2006.

Specification ICC. 1:Oct. 2004 (Profile Version 4.2.0.0) Image Technology Colour Management-Architecture, profile format, and data structure. International Color Consortium. May 22, 2006.

Raja Bala and Alvaro E Gil and Marty S Maltz and Lalit K Mestha and Yao Rong Wang. Recent Developments Towards Control-Based Color Profiling Technology. Xerox Research Center. Sep. 24, 2009.

* cited by examiner

METHOD FOR MAPPING AN OUT-OF-GAMUT COLOR USING A REFERENCE GAMUT MAPPING

TECHNICAL FIELD

The present invention is directed to systems and methods for mapping an out-of-gamut color to a boundary surface of a gamut of a color marking device using the gamut mapping of a reference device without the actual knowledge of the reference gamut mapping strategy.

BACKGROUND

In digital imaging systems, color management is the controlled conversion between the color representations of various devices, such as image scanners, digital cameras, monitors, TV screens, film printers, marking devices, offset presses, and corresponding media. One of the primary goals of color management is to obtain a good match across color devices; for example, a video which should appear the same color on a computer LCD monitor, a plasma TV screen, and on a printed frame of video. Mapping of color spaces to the target color points of different target devices is used since many devices do not have the same gamut, or range of colors and brightness, that they are able to produce. For example, some colors outside of a target device's gamut need to be carefully mapped to the surface or inside of the gamut as they otherwise cannot be represented on the output device and would simply be clipped to some undesirable point on the gamut. Color mapping functions are used to adjust the numerical values that are sent to, or received from, different devices so that the perceived color they produce remains consistent. Such color mapping is often performed during profile creation. Standardizing run-time custom profiling code becomes difficult to achieve as no single unique gamut mapping strategy is able to be applied to color space which simultaneously satisfies all requirements such as pleasing color, contrast, lightness, chroma, hue, and the like, across all out-of gamut color points.

Methods have been developed for retrieving or otherwise reverse-engineering color gamut mapping rays from an original ICC profile so that the same gamut mapping can be incorporated in custom destination profiles during runtime. However, the shapes of the gamuts between two devices may vary substantially. These variations may be due to different curvatures of the gamut surface custom made by different toners/inks. If the shapes of the gamuts of the seed and host devices are substantially different, the gamut mapping vectors can either completely miss the surface of the host gamut or intersect the host gamut at an erroneous location, thus producing false gamut mapping rays which may lead to pathological results such as to color contours arising in the output print. False gamut mapping rays need to be automatically compensated for without a user intervention.

Accordingly, what is needed in this art is a method for mapping out-of-gamut colors of a device to its gamut by using the gamut mapping strategy of another device as a reference which accounts for those instances wherein the shapes of the two gamuts are substantially different.

INCORPORATED REFERENCES

The following U.S. patent applications, U.S. patents, and Publications are incorporated herein in their entirety by reference.

"Method To Retrieve A Gamut Mapping Strategy", U.S. patent application Ser. No. 12/630,093, to Mestha et al.

"Ray-Based Compression Mapping In A Color Management System", U.S. application Ser. No. 12/391,473, to Mestha.

"Mapping An Out-Of-Gamut Color To A Surface Of A Color Gamut", U.S. patent application Ser. No. 12/391,504 to Mestha et al.

"Determining Whether A Color Is Inside Or Outside A Boundary Surface Of A Color Gamut", U.S. patent application Ser. No. 12/391,529 to Mestha et al.

BRIEF SUMMARY

What is disclosed is a novel system and method for mapping out-of-gamut colors of a device to its gamut by using the gamut mapping strategy of another device as a reference which accounts for those instances wherein the shapes of the two gamuts are substantially different. In one embodiment, a set of test colors, usually the nodes of a 3-dimensional lookup table, are identified as those points at which the gamut mapping vectors are to be estimated. These test colors are classified as being one of the following: 1) A color that is within a boundary surface of the gamut of the host device. Colors in this case do not undergo any gamut mapping transform as these are already within the boundary surface of the host gamut of the host device. 2) A color that is within a boundary surface of the gamut of the seed device and outside of boundary surface of the gamut of the host device. Colors in this case do not have any gamut mapping vectors to draw from the seed profile and the vectors thus need to be estimated. 3) A color that is outside the boundary surface of the gamuts of both the host and seed devices. Colors in this case have gamut mapping vectors to draw from the seed profile. However, if the shapes of the seed and host gamuts are substantially different, the gamut mapping vectors drawn from the seed profile can either completely miss the host gamut or intersect the host gamut at an oblique angle, thus producing false gamut mapping rays which may lead to contours. The present method is directed towards correcting such anomalies.

In one example embodiment, the present method for mapping an out-of-gamut target color to a host gamut of a host device involves the following. First, a total of N number of node colors are selected. Each of the node colors $x_j$, where $j=1 \ldots N$, have respective target L*a*b* values. Each of the selected node colors is determined to be outside a boundary surface of a seed gamut of a seed device and outside a boundary surface of a host gamut of a host device. Each of the target L*a*b* values of each node color is then passed through the seed profile of the seed device to obtain a corresponding seed-mapped color. In various embodiments, the seed profile can be a historical color profile or an ICC profile, and the seed device can be a reference print engine or a proofing device. Then, for all node colors, the following 3 steps are iteratively performed. (1) A ray is traced between a node color and a seed-mapped color. The slope of the ray defines a direction of mapping between the node color and the seed-mapped color. (2) The ray is then extended in the direction of mapping until the ray intersects a boundary surface of the host gamut or intersects a boundary of the L*a*b* cube. The point of intersection with the boundary surface of the host gamut becomes a host-mapped color. Each seed-mapped color and host-mapped color is a seed-host pair. (3) A distance is then calculated between the seed-host pair. Then, for all seed-host pairs the following 2 steps are iteratively performed. (1) The distance calculated between this seed-host pair is compared against a pre-determined threshold. (2) In response to this seed-host pair having a distance which is below the threshold, the respective target L*a*b* values of this seed-host pair are added to a set of well-mapped colors. Otherwise, the target L*a*b* values of the seed-host pair are added to a set of outlier colors. Once the set of seed-host pairs has been divided into a set of well-mapped colors and a set of outlier colors, a target color is selected from the set of outlier colors and a distance is calculated between the target color and the target L*a*b* values of each well-mapped color in the set of well-mapped colors. A total of M neighbor colors are selected from the set of well-mapped colors based upon this distance such that each well-mapped neighbor color is within a neighborhood surrounding the target color. In a manner discussed herein further, a new direction of mapping is determined for the selected target color. The new direction of mapping is based upon the target L*a*b* values of the host-mapped color of well-mapped neighbor colors surrounding the target color. The new direction of mapping is used to map the target color to the host gamut of the host device. Other target colors in the set of outlier colors (and orphan colors) are selected and the process repeats until all desired target colors have been mapped to the surface of the host gamut.

Many features and advantages of the above-described method will become readily apparent from the following detailed description and accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

Figure 1:
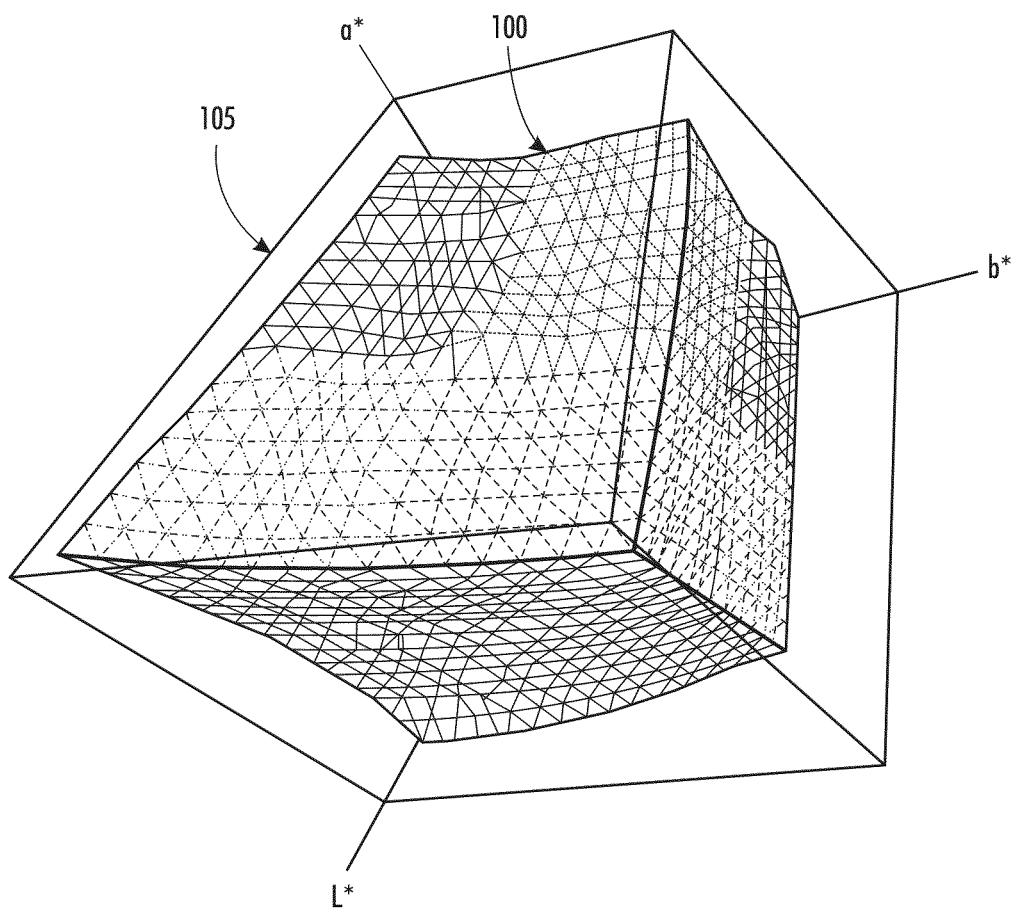
FIG. 1 illustrates an example color space with a generic CMYK printer gamut.

What is disclosed is novel system and method for mapping out-of-gamut colors of a device to its gamut by using the gamut mapping strategy of another device as a reference which accounts for those instances wherein the shapes of the two gamuts are substantially different. In a manner more fully described herein, the present method provides an embodiment which accounts for the pathological case of a false gamut mapping ray being produced in those instances where the shapes of the gamuts of the host and seed devices are substantially different. In these instances, the rays miss the boundary surface of the host gamut and intersect the boundary of the L*a*b* cube. Another embodiment is provided which accounts for those cases wherein the ray intersects the host gamut at a substantially oblique angle such that mapped color is sufficiently different to generate contours in the output print.

It should be understood that one of ordinary skill in this art would be readily familiar with many facets of color science such as, but not limited to, color space, color gamuts, gamut mapping, and other related techniques and algorithms commonly found in the color science arts. Additionally, one of ordinary skill would also be familiar with advanced mathematical techniques used for color manipulation and various color transformation processes. Those of ordinary skill would be familiar with the text: "*Digital Color Imaging Handbook*", 1st Ed., CRC Press (2003), ISBN-10: 084930900-X, ISBN-13: 97808-4930-9007, and "*Control of Color Imaging Systems: Analysis and Design*", CRC Press (2009), ISBN-13: 97808-4933-7468, both of which are incorporated herein in their entirety by reference.

Non-Limiting Definitions

A L*a*b* space is a color-opponent space whose coordinates are given by {L*, a*, b*} with dimension L* for luminance and a* and b* for the color-opponent dimensions based on non-linearly compressed CIE XYZ color space coordinates. Luminance (L*) is a photometric quantity which, in essence, is the effect of radiance on our eyes. Chrominance (a*) is the chrominance of a first channel. Chrominance (b*) is the chrominance of a second channel. Radiance is the physical quantity related to light intensity, i.e., the power of the light spreading out in some solid angle over an area. Luminance is the integration of radiance weighted with a curve, which describes how efficiently different wavelengths of light trigger visual receptors in the eye. Brightness is the subjective visual experience of luminance, i.e., the effect of luminance on the brain. In one embodiment, L*a*b* values can be computed from the tristimulus values (XYZ) using the following:

$$L^* = 116\left[f\left(\frac{Y}{Y_n}\right) - \frac{16}{116}\right]$$

$$a^* = 500\left[f\left(\frac{X}{X_n}\right) - f\left(\frac{Y}{Y_n}\right)\right]$$

$$b^* = 200\left[f\left(\frac{Y}{Y_n}\right) - f\left(\frac{Z}{Z_n}\right)\right]$$

$$f(x) = \begin{cases} x^{\frac{1}{3}} & \text{if } x \geq 0.008856 \\ 7.787x + \frac{16}{116} & x \leq 0.008856 \end{cases}$$

where $X_n$, $Y_n$, $Z_n$, are tristimulus values for the reference white.

A "profile" contains a multidimensional color correction lookup table (LUT) generally comprising a series of nodes in an input color space (L*a*b* or XYZ), and device-specific (CMYK) output values stored at each node. When the input pixels to be corrected correspond to the nodes of the LUT, the corresponding device-specific color values are retrieved directly from the LUT. If the pixels are not on the node, then they are derived via interpolation using a variety of standardized techniques, such as, for example, tetrahedral interpolation. In general, a profile is derived from a forward model that maps a device-specific (CMYK) representation to a visual (L*a*b*) color representation. The L*a*b* or XYZ values are passed to a "destination profile", which defines yet another mathematical transformation between the amounts of the colorants from the reference color space and the destination color space that devices would need to use to render the color. These mathematical transformations are often embodied as multi-dimensional LUTs which provide the capability to match the printed color to a proofing device. A multi-dimensional profile LUT has finite nodes for which device CMYK values are calculated during profile creation. In general, a color profile is a description of a device-specific color space in terms of the transformations required to convert its color information to a device-independent color space. For example, a device-specific color space would define device-specific RGB or CMYK values.

A "seed profile" refers to a profile of a given device containing a gamut mapping strategy. The seed profile can be a historical color profile or any other profile with an inverse LUT and a forward LUT. It may not necessarily be in the ICC framework.

A "seed device" refers to the device for which the gamut mapping was previously generated. The seed device can be either a reference print engine or a reference proofing device. Proofing devices generally include densitometers, spectro-densitometers, printability tester, Pantone® color light boxes, and Pantone® color charts.

The "seed gamut" is the gamut of the seed device.

A "host profile" is the profile created for the host device.

A "host device" refers to the device for which the gamut mapping is being retrieved. The host device can be any color device capable of receiving commands to render a received signal of a color image to viewable form. To render an image includes displaying the image, outputting the image to a storage media, transmitting the image, or forming the image onto a media substrate through the visual integration of colorants (e.g., inks, toners, pigments, etc.) deposited thereon.

The "host gamut" is the gamut of the host device.

A "node color" is a color ($x_j$) for j=1 to $N_c$, where $N_c$ is the total number of node colors whose respective target L*a*b* values are both outside the boundary surface of a seed gamut of a seed device and outside the boundary surface of a host gamut of a host device. Node color $x_j$ has L*a*b* values with coordinates $\{L^*_j, a^*_j, b^*_j\}$.

A "seed-mapped color" is a color ($x_{sj}$) for j=1 to $N_c$, produced by passing the respective target L*a*b* values of node color $x_j$ through a seed profile of a seed device. Seed-mapped color $x_{sj}$ has L*a*b* values with coordinates $\{L^*_{sj}, a^*_{sj}, b^*_{sj}\}$. Each seed-mapped color corresponds to a node color.

A "host-mapped color" ($x_{hj}$), for j=1 to $N_w$, where $N_w$ is the number of well-mapped colors, is a seed-mapped color $x_{sj}$ which has been mapped to a corresponding point on the boundary surface of the host gamut. Host-mapped color $x_{hj}$ has L*a*b* values with coordinates $\{L^*_{hj}, a^*_{hj}, b^*_{hj}\}$.

A "seed-host pair" is a pair of colors ($<x_{sj}-x_{hj}>$) for j=1 to $N_p$, where $N_p$ is the total number of seed-host pairs, which comprises a seed-mapped color $x_{sj}$ and a corresponding host-mapped color $x_{hj}$.

An "outlier color" ($x_{ot}$) for t=1 . . . $N_t$, where $N_t$ is the number of colors in the set of outlier colors, is a node color of a corresponding seed-mapped color whose ray between this seed-mapped color's respective seed-host pair intersected the boundary of the L*a*b* cube wherein the host gamut resides.

A "well-mapped color" ($x_{wk}$) for k=1 . . . $N_w$, for $N_w$ is the number of colors in the set of well-mapped colors, is a node color of a seed-mapped color of a seed-host pair whose ray intersects the boundary surface of the host gamut. Well-mapped color $x_{wk}$ has L*a*b* values with coordinates $\{L^*_{wk}, a^*_{wk}, b^*_{wk}\}$.

"Well-mapped neighbor color" ($x_{wn}$) for n=1 to M, where M is the total number of well-mapped neighbor colors and M≤$N_w$, is a node color in the set of well-mapped colors which is in a neighborhood of colors surrounding target color $x_\alpha$ as defined by a distance $d_{\alpha k}$ calculated between target color $x_\alpha$ and the L*a*b* values of well-mapped color $x_{wk}$. Well-mapped neighbor color $x_{wn}$ has L*a*b* values with coordinates $\{L^*_{wn}, a^*_{wn}, b^*_{wn}\}$.

"Well-mapped on-the-host color" ($x_{hwn}$) for n=1 to M, is a well-mapped neighbor color which has been mapped to a point of intersection on the boundary surface of the host gamut. Well-mapped on-the-host color $x_{hwn}$ has L*a*b* values with coordinates $\{L^*_{hwn}, a^*_{hwn}, b^*_{hwn}\}$.

A "ray" (ray) for j=1 to $N_p$, is a line traced between as a start point comprising the L*a*b* values of node color $x_j$ and an end point comprising the L*a*b* values of the seed-mapped color ($x_{sj}$). A slope of the line defines a direction of mapping between the start and end points of the ray. In a manner more fully described herein, the ray is incrementally extended in the direction of mapping until the ray either intersects the boundary surface of the host gamut, or the ray misses the host gamut entirely and instead intersect the boundary of the L*a*b* cube wherein the host gamut resides.

The present method maps an out-of-gamut color to a boundary surface of a color gamut by using an existing gamut mapping as a reference and accounts for two pathological cases which give rise to unwanted color contours arising in an output print. Gamut mapping refers to any algorithm or strategy which defines a relationship between a set of input color values present in the first color gamut to a corresponding set of output color values of a second color gamut. The first and second color gamuts may or may not be in the same color space. Mapping of color spaces of different target devices is used since many devices don't have the same gamut, or range of colors and brightness, that they are able to produce. For example, some colors outside of a target device's gamut need to be shifted to the inside of the gamut as they otherwise cannot be represented on the output device and would simply be clipped. For instance, printing a mostly saturated blue color as displayed on a monitor to a paper output using a typical CMYK printer will likely fail. The paper blue may not be that saturated. Conversely, the bright cyan of an inkjet printer may not be easily presented on an average computer monitor. Gamut mapping methods utilize color mapping functions which map received color values of an input image to the target gamut of the output device such that the rendered output colors remain visually consistent with the original image. The gamut mapping operation is incorporated into the nodes of a 3-D LUT. It should be appreciated that a quality gamut mapping function should first try to preserve hue, then try to preserve lightness and chroma as much as possible. It should also try to preserve as much spatial information, i.e., color relationships between neighboring pixels, as possible while minimizing artifacts such as halo effects, hue shifts, posterization, and the like, such that these are no longer visible when the output gamut-mapped color image is rendered to an image output device.

Reference is now being made to FIG. 1 which illustrates an example generic seed gamut 100 of a seed device. The example generic seed gamut 100 is a multi-dimensional color space having a boundary surface encompassing a given volume. The seed gamut defines the color space for a seed device and refers to a complete subset of color values of a given color space as defined by the spectrum of light, i.e., the distribution of light energy versus wavelength, interacting with the spectral sensitivities of the eye's light receptors and the colorants on the substrate. The axes of the color space are defined by the pigments used in the colorants of the primary colors capable of being reproduced by the seed device. The example seed gamut of FIG. 1 has 14 corners, 24 edges, and 12 faces. A cluster definition defines clusters in or around the vicinity of the corners, edges, and faces. Such a definition is motivated by an observation that different mapping algorithms tend to be optimum for different regions of the gamut. One cluster is defined for the first corner, another cluster for the second corner, and so forth, for each of the 14 corners. One cluster is defined for the first face, another for the second face, and so forth, for each of the 12 faces. A cluster is further defined for points near each edge for each of the 24 edges. The seed gamut is also shown enclosed within the boundaries of an example L*a*b* cube 105. All colors are located within the cube. In RGB space, each color in the cube can be represented as a triplet (R, G, 8) where values for R, G, and B are assigned in the range from 0 to 1 (or from 0 to the bit depth of the device). In an ideal case, the mixture of two additive primaries produces a subtractive primary. Thus, the mixture of the red (1, 0, 0) and green (0, 1, 0) is yellow (1, 1, 0). The mixture of red (1, 0, 0) and blue (0, 0, 1) is magenta (1, 0, 1). The mixture of green (0, 1, 0) and blue (0, 0, 1) is cyan (0, 1, 1). A white (1, 1, 1) is obtained when all three primaries are added together and black (0, 0, 0) is located at the origin of the cube, i.e., the intersection of the axis.

Figure 2:
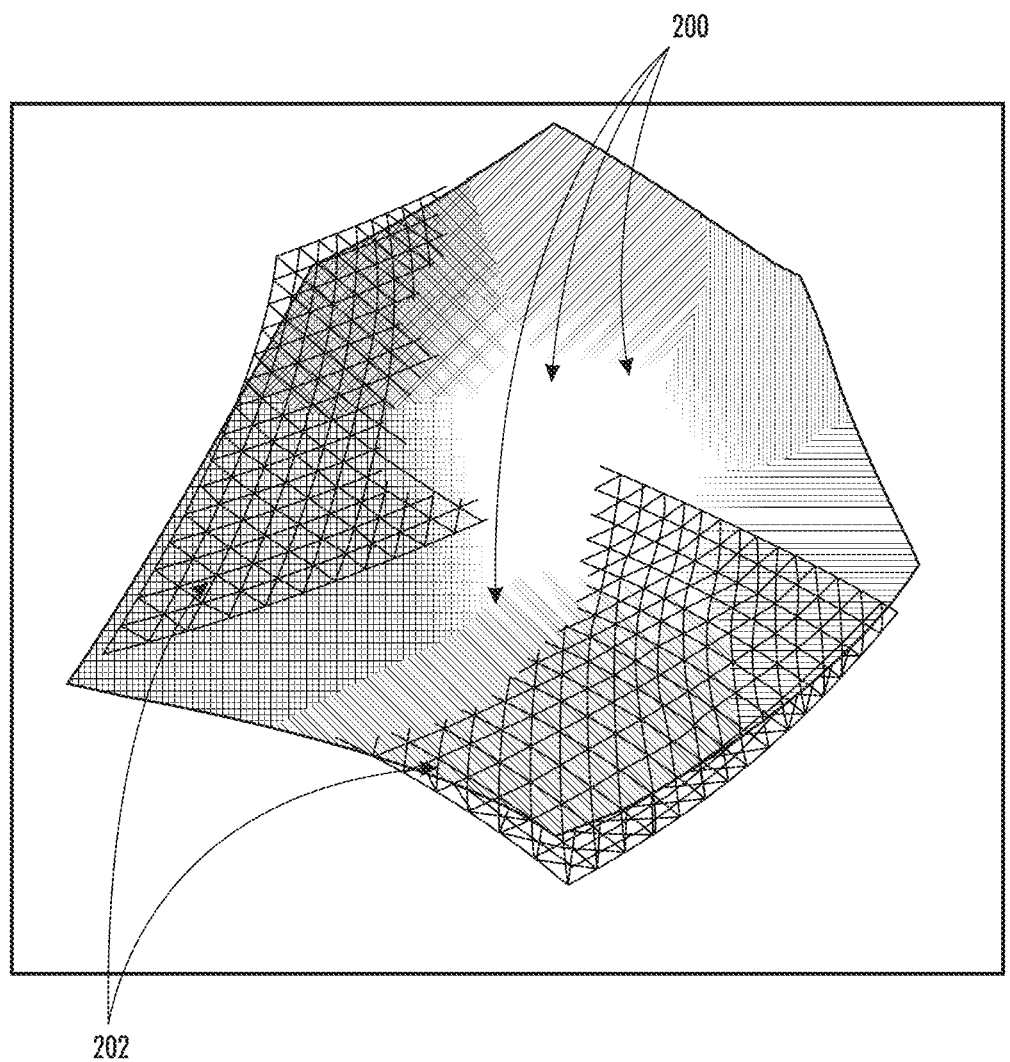
FIG. 2 illustrates the example generic seed gamut 100 of FIG. 1 overlaid a host gamut 200 defining a color space of a host device.

Reference is now being made to FIG. 2 which illustrates the example generic seed gamut 100 of FIG. 1 overlaid a host gamut 200 defining a color space of a host device. As can be seen in the overlay of FIG. 2, the two gamuts are substantially the same having substantial overlap. Areas shown in crosshatching are those portions of seed gamut 100 which lay outside the boundary surface of the host gamut 200. Color points that are within the boundary surface of the seed gamut 100 but which lay outside the boundary surface of the host gamut 200 require a gamut mapping. This is referred to as the inside/outside case. Further, color points which lay outside the boundary surface of both the seed gamut and the host gamut need to be mapped to the boundary surface of the host gamut. This case is referred to as the outside/outside case.

As will be explained herein further, out-of-gamut color points of a host device require gamut mapping to corresponding color points on the surface of the host gamut of a host device. This is achieved by tracing a ray from the out-of-gamut point to the surface of the host gamut. However, in tracing the ray, two problem cases may arise which are individually addressed by the embodiments hereof. When a color point is to be mapped to a host gamut, a ray is generated and traced in a given direction until the ray either intersects the boundary surface of the host gamut or the ray missed the host gamut and instead intersects the boundary of the L*a*b* cube. These problems are shown and discussed with respect to FIG. 3. In a first case, ray 302 is traced from out-of-gamut color point 304 in a direction which causes ray 302 to miss the boundary surface of the host gamut 301 entirely and, instead, intersect the boundary of the L*a*b* cube 305 at intersection point 303. In a second case, a ray 306 is traced from color point 304 until the ray intersects the boundary surface of the host gamut at intersection point 307 however, ray 306 intersects the surface of the host gamut at such an oblique angle 309 that the gamut-mapped color is different from out-of-gamut color point 304. This is even more visually perceptible in the case where the ray missed the host gamut entirely and intersected the boundary of the L*a*b* cube instead.

Figure 3:
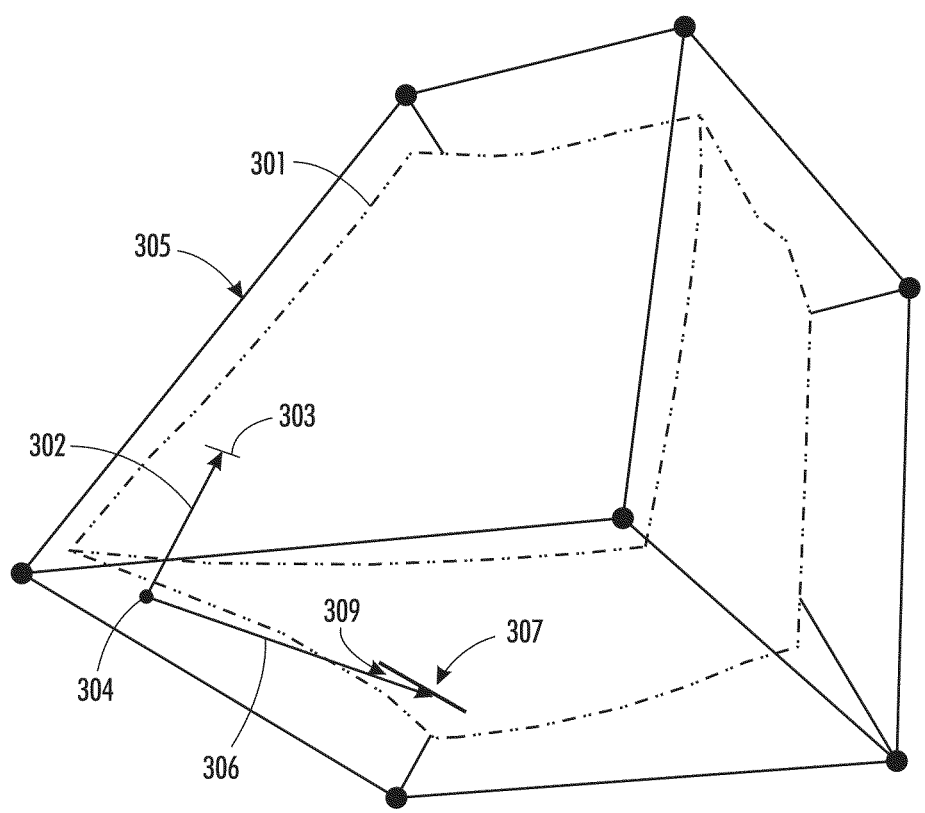
FIG. 3 illustrates a first and second problem cases addressed by the various embodiments disclosed herein.
Figure 4:
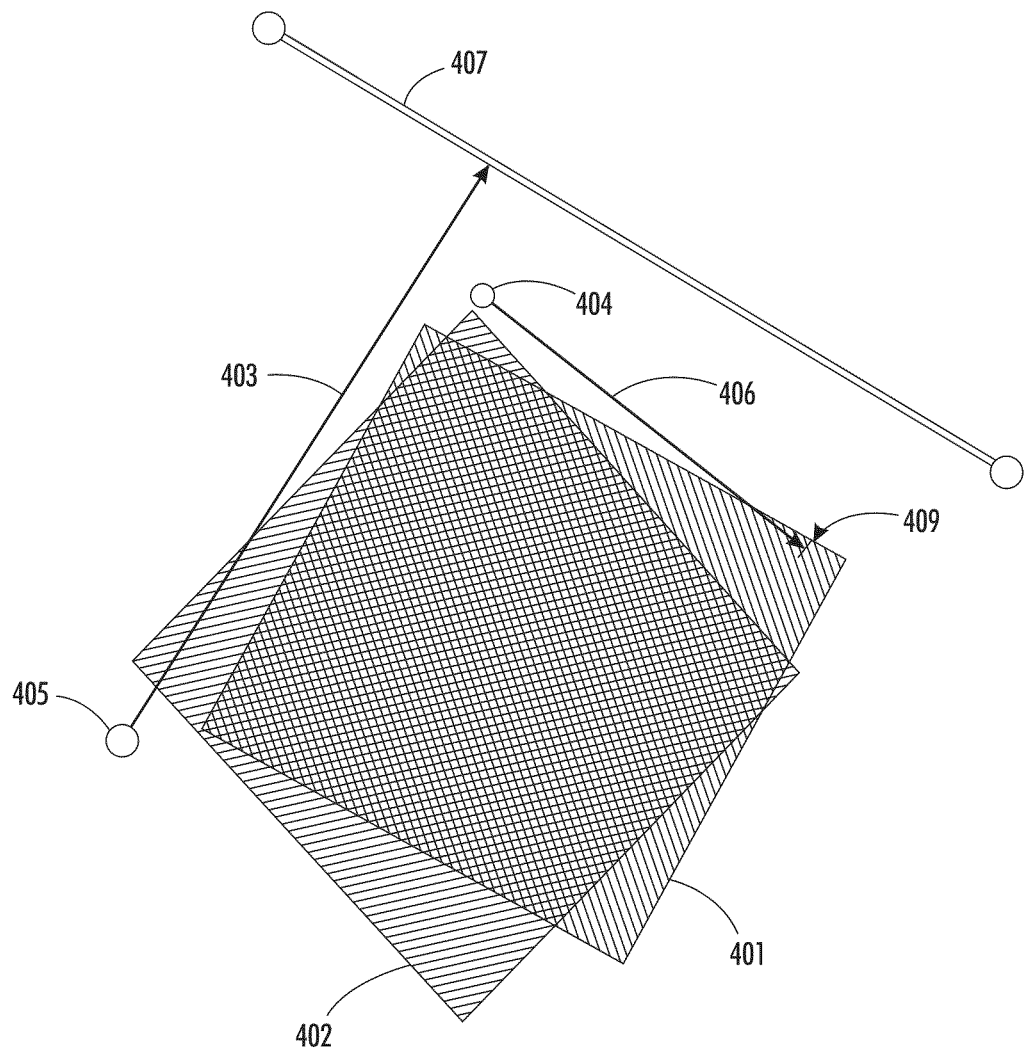
FIG. 4 shows the first and second problem cases of FIG. 3 from a different perspective.

Reference is next being made to FIG. 4 which shows the first and second problem cases of FIG. 3 from a different perspective. A slice of host gamut 401 is shown overlaying a slice of seed gamut 402. In a first case, ray 403 is traced from target color 405 in a direction of mapping which causes ray 403 to miss the boundary surface of host gamut 401 and instead causes the ray to intersect the boundary of the L*a*b* cube 407. In a second case, ray 406 is traced from target color 404 to the host gamut 401 to the surface of the host gamut at 409. The intersection of ray 406 with the surface is at a location on the surface of the host gamut which is not in close proximity to the location of the target color in color space. Each of the rays has a corresponding slope which defines a direction of mapping. As shown in FIG. 10, a ray 1004 is traced from target color 1002 in a direction of mapping which causes the ray to miss the boundary surface of the host gamut 1000 and intersect with the boundary of the L*a*b* cube (not shown). Similarly, a ray 1010 is traced from target color 1008 in a direction which causes the ray to intersect the boundary surface of the host gamut at an oblique angle. To resolve these cases, a new direction of mapping needs to be determined. The new direction of mapping, as determined in a manner discussed herein further, is calculated for target color 1002 such that a new ray 1006 is traced from target color 1002 to a point on the boundary surface of the host gamut along a new slope defined by the new mapping direction. Similarly, a new ray 1012 is traced along a new direction of mapping determined for target color 1008 such that this target color is also mapped to point on the boundary surface of the host gamut. Such an embodiment is next discussed with respect to the flow diagram of FIGS. 5-9.

Figure 5:
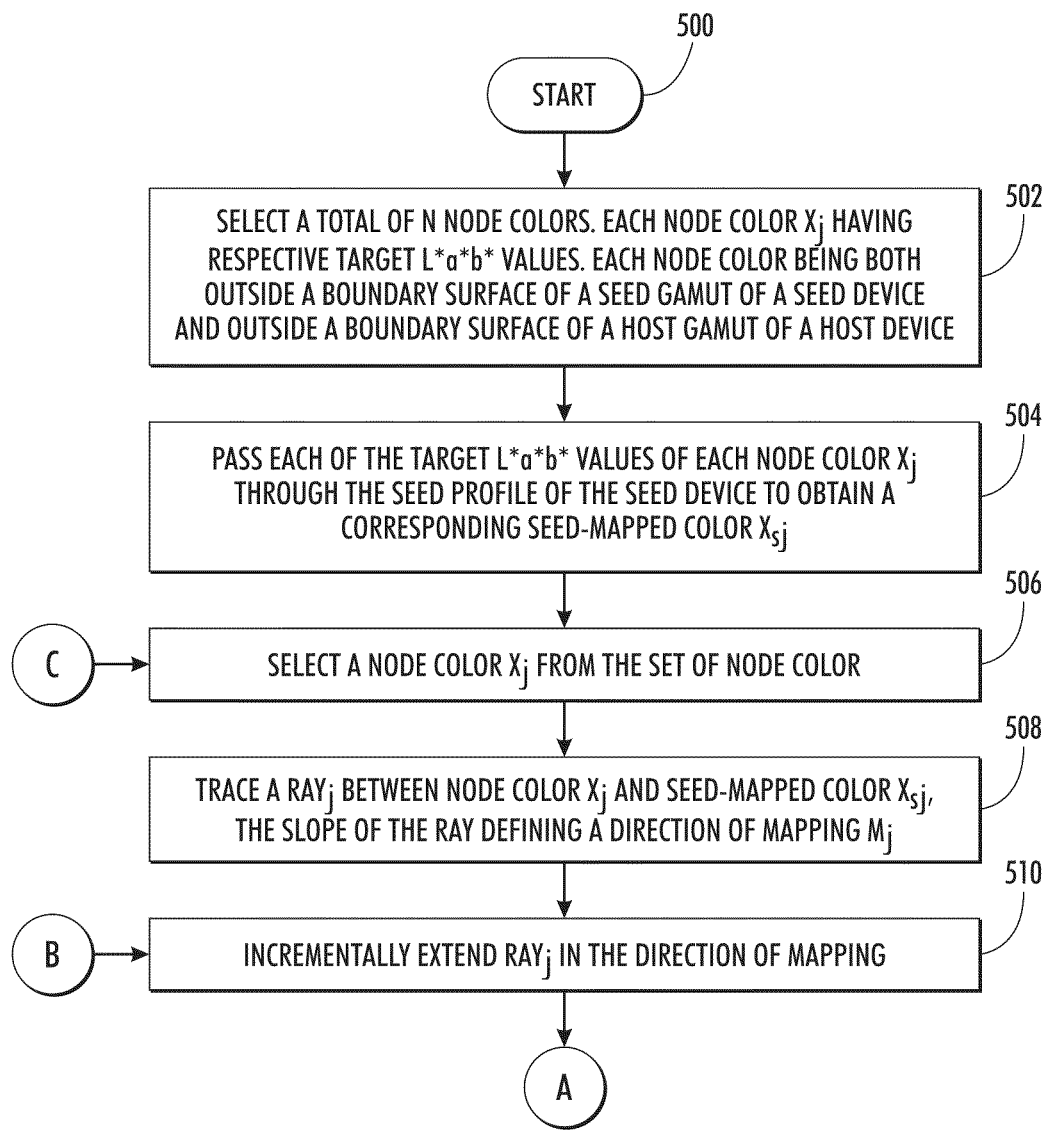
FIG. 5 is a flow diagram of one example embodiment of the present method for determining a new direction of mapping for a given target color.

Reference is now being made to the flow diagram of FIG. 5 which shows one example embodiment of the present method for determining a new direction of mapping for a target color. In this flow diagram, the target color point intended to be mapped is outside both the seed gamut and the host gamut (as shown in FIG. 4). Flow processing starts at 500 and immediately proceeds to step 502.

Figure 11:
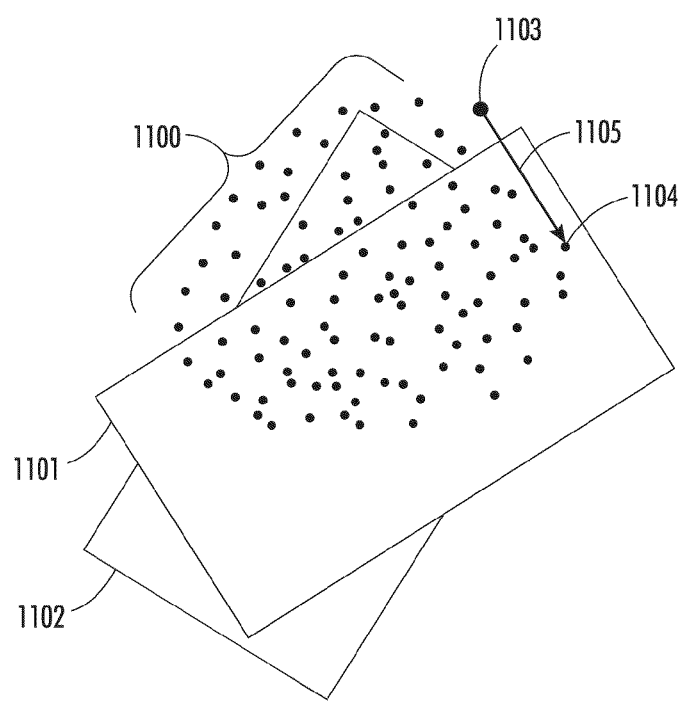
FIG. 11 shows a plurality of node colors which are both outside a boundary surface of a host and a seed gamut.

At step 502, select a total of k node colors are selected. Each node color in the set of node colors has respective target L*a*b* values. Each node color is selected because it's respective target L*a*b* values are both outside the boundary surface of a seed gamut of a seed device and outside the boundary surface of a host gamut of a host device. FIG. 11 shows an example set of node colors, shown collectively at 1100, which are both outside a boundary surface of a host gamut 1101 (shown as a slice of a gamut surface) and a boundary surface of a seed gamut 1102 (shown as a slice of a gamut surface). It should be appreciated that FIG. 11 is for illustrative and explanatory purposes and that the actual number and location of node colors will likely be much different than the illustration. Methods for determining whether a given node color is inside/outside a boundary surface of a gamut are well established. The following is provided as a quick method for determining whether color point $x_j$ is inside/outside a boundary surface of a gamut. First, initialize a threshold error value to a default value. Then, obtain corresponding mapped L*a*b* values by passing the respective target L*a*b* values of color point $x_j$ through the color profile which defines the gamut. Determine an amount of ΔE color separation between the corresponding mapped L*a*b* values and the respective target L*a*b* values of color point $x_j$. Then, compare the amount of ΔE color separation between these two color values to the threshold error value. If the amount of ΔE separation is less than the threshold error value then color point $x_j$ is inside the boundary surface of the gamut. Otherwise, color point $x_j$ is outside the boundary surface of the gamut.

At step 504, each respective target L*a*b* values of each node color is passed through the seed profile of the seed device. Passing the target L*a*b* values through the seed profile generates a corresponding seed-mapped color $x_s$. An example seed-mapped color corresponding to example node color 1103 is shown at 1104 of FIG. 11. In various embodiments, the seed profile can be a historical color profile or an ICC profile, and the seed device can be a reference print engine or a proofing device. Other embodiments of a seed profile and a seed device are intended to fall within the scope of the appended claims.

At step 506, a node color $x_j$ is selected from the set of node colors for processing, where j=1 ... $N_c$. It should be appreciated that one may wish to select only a subset of node colors from the set of node colors (originally selected in step 502). Each of the node colors is intended to be processed in a manner described in the steps which follow.

At step 508, a $ray_j$ is traced between selected node color $x_j$ (step 506), and this node color's corresponding seed-mapped color $x_{sj}$ (step 504). The ray has the L*a*b* values of the node color as a start point and the L*a*b* values of the seed-mapped color as an end point. An example ray traced between node color 1103 and seed-mapped color 1104 is shown at 1105 of FIG. 11.

Ray generation can be described in generic terms as follows. For a given node color, define a line between start and end points in three-dimensional color space. Let $x_0$ be the start color and $x_K$ be the end color. The start color $x_0$ is the unmapped color (i.e., target L*a*b* derived from RGB space) and the end color, $x_K$, is the mapped color to the seed gamut of the seed device. The ray can be modeled by an equation connecting these two points in 3-dimensional space.

In one embodiment, $ray_j$ traced for the $j^{th}$ node color, where j=1 ... $N_c$, comprises a line given by:

$$x = x_j + m_j i, \quad (1)$$

where i=0 to K, where K is the total number of points along the line, and $m_j$ is the slope of the line which determines a direction of mapping between node color $x_j$ and seed-mapped color $x_{sj}$. Node color $x_j$ has target L*a*b* values with coordinates $\{L^*_j, a^*_j, b^*_j\}$, and seed-mapped color $x_{sj}$ has target L*a*b* values with coordinates $\{L^*_{sj}, a^*_{sj}, b^*_{sj}\}$. It should be appreciated that index i can be incremented beyond the number of points K such that the ray is extended along the same slope. In other words, each of the points along the ray has a color value represented by point $x_i$ where i is the index between zero and some integer value, e.g., 3K, for example. Thus, at one end of the ray, i.e., when i=0, resides start point $x_0$. At the other end of the ray, i.e., when i=3K for example, resides end point $x_{3K}$. Each ray can be considered a ray-based color model for each node color pair where the slope of $ray_j$ defines a direction of mapping $m_j$ between $x_j$ and $x_{sj}$. One embodiment of the direction of mapping is given by the following relationship:

$$m_j = \frac{1}{\sqrt{(L^*_{sj} - L^*_j)^2 + (a^*_{sj} - a^*_j)^2 + (b^*_{sj} - b^*_j)^2}} \begin{bmatrix} L^*_{sj} - L^*_j \\ a^*_{sj} - a^*_j \\ b^*_{sj} - b^*_j \end{bmatrix}. \quad (2)$$

The direction of mapping $m_j$ for each corresponding $ray_j$ is used herein further.

Figure 12:
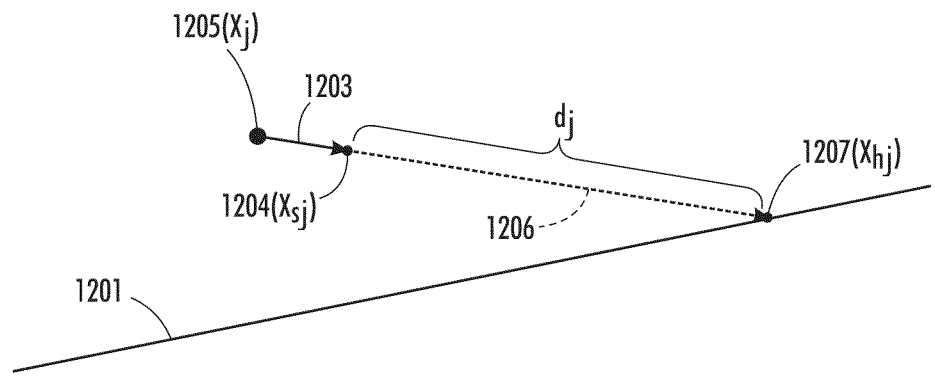
FIG. 12 shows a ray traced between a node color and the corresponding seed-mapped color which, when extended, intersects the boundary surface of the host gamut 1201.
Figure 13:
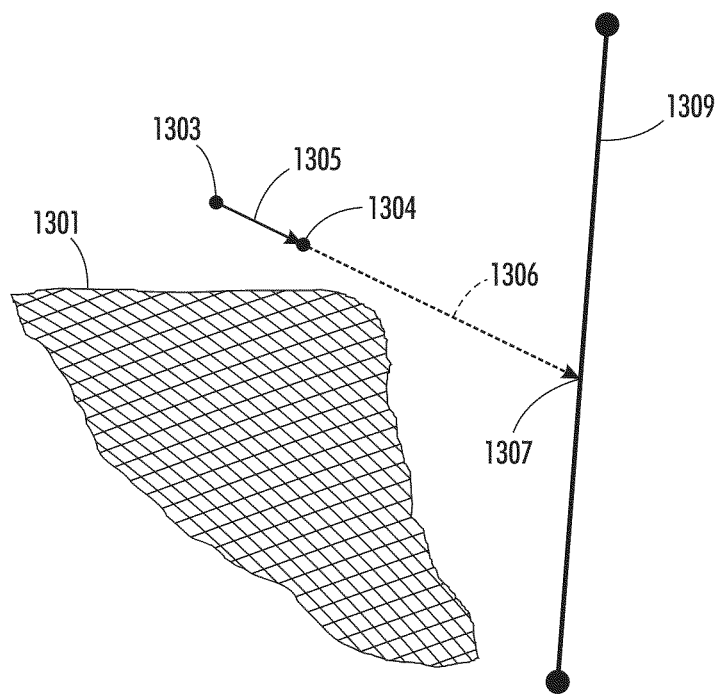
FIG. 13 shows a ray traced between a node color and the corresponding seed-mapped color which, when extended, intersects the boundary of the L*a*b* cube 1309.

At step 510, the ray (of step 508) is extended in the direction of mapping by incrementally increasing the index i in a manner described above with respect to Eq. 1. The example ray 1105 of FIG. 11 is shown having been incrementally extended in FIG. 12. In FIG. 12, the example ray 1203, traced between node color 1205 and seed-mapped color 1204, has been extended (as shown by ray extension portion 1206) such that the ray intersects the boundary surface of the host gamut 1201. In FIG. 13, another example ray 1305, traced between node color 1303 and seed-mapped color 1304, has been incrementally extended (as shown by ray extension portion 1306) such that the ray missed the boundary surface of the edge of host gamut 1301 and instead intersected the boundary of the L*a*b* cube 1309 wherein the host gamut resides at intersection point 1307.

Figure 6:
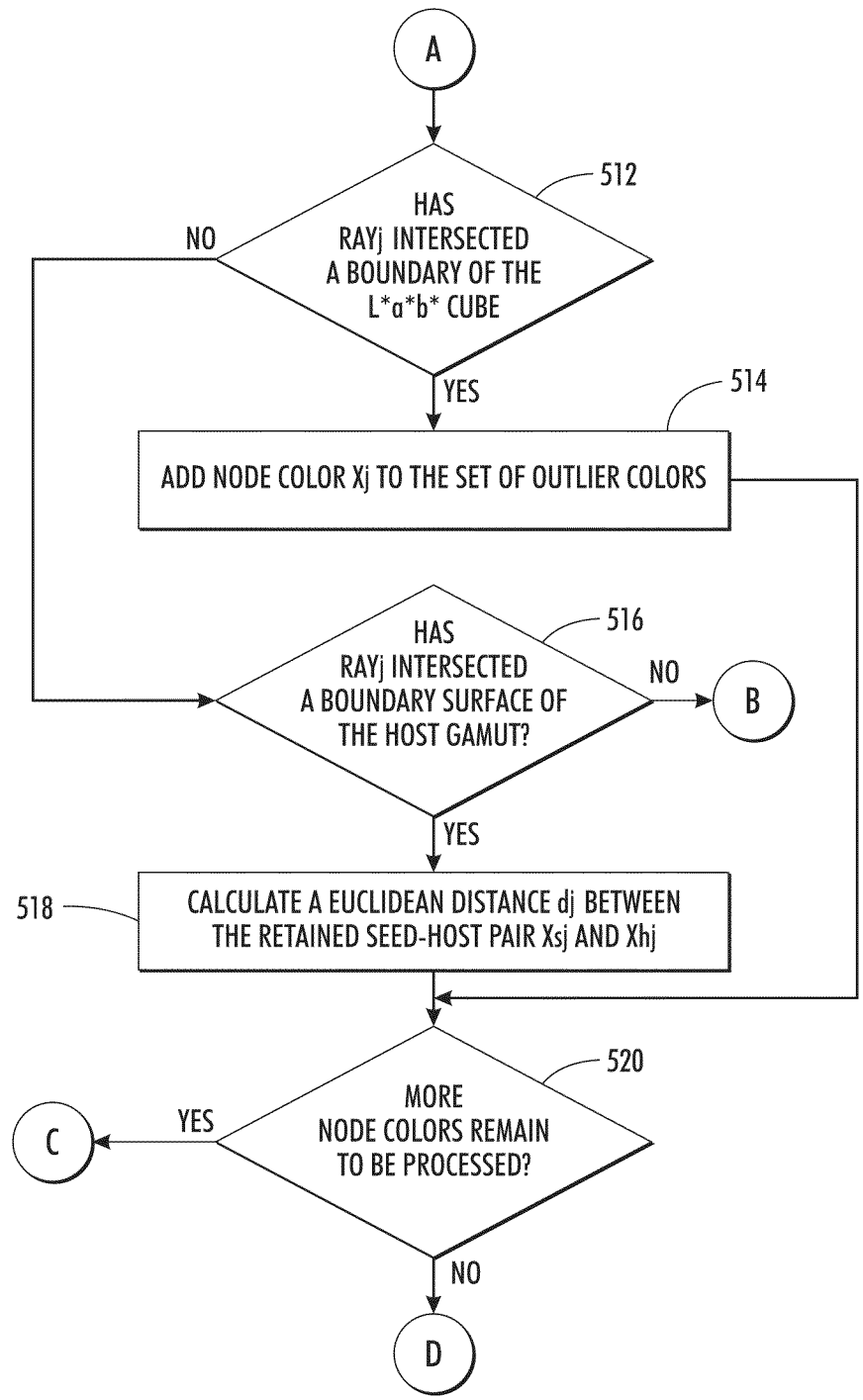
FIG. 6 is a continuation of the flow diagram of FIG. 5 with flow processing continuing with respect to node A.

Reference is now being made to the flow diagram of FIG. 6 which is a continuation of the flow diagram of FIG. 5, with flow processing continuing with respect to node A.

At step 512, a determination is made whether $ray_j$ has intersected a boundary of the L*a*b* cube. One example illustration of an extended ray, for example between start point $x_j$ and end point $x_{sj}$, intersecting the boundary of the L*a*b* cube is shown and discussed with respect to ray 302 of FIG. 3. Ray 302 intersects the boundary of the L*a*b* cube 305 at intersection point 303. Another example illustration of an extended ray is shown and discussed with respect to ray 1305 and ray extension portion 1306 of FIG. 13 which intersects the boundary of the L*a*b* cube at intersection point 1307. Methods for determining whether a color point intersects a boundary of the L*a*b* cube are well known.

At step 514, if the ray has intersected the boundary of the L*a*b* cube then the corresponding node color $x_j$ of $ray_j$ is considered an orphan color, i.e., a color without a mapping direction to the host gamut (for example, node color 1303 of FIG. 13). Orphan colors still require mapping. As such, orphan color $x_j$ is added to the set outlier colors which are processed herein further with respect to step 534. Processing proceeds with respect to step 520 wherein a determination is made whether any more node colors from the set of node colors selected in step 502 remain to be processed. If so, then processing repeats with respect to node C of FIG. 5 wherein a next node color is selected from the set of node colors. Once all the node colors have been processed, processing proceeds with respect to node D of FIG. 7. Otherwise, processing continues with respect to step 516.

At step 516, a determination is made whether $ray_j$ has intersected a boundary surface of the host gamut. As $ray_j$ is incrementally extended, the ray is repeatedly checked to see whether it has intersected the boundary of the L*a*b* cube or whether it has intersected the boundary surface of the host gamut. If it has been determined that $ray_j$ has not yet intersected the boundary surface of the host gamut then processing proceeds with respect to node B of FIG. 5 wherein, at step 510, $ray_j$ is again incrementally extended in the direction of mapping, as discussed with respect to Eqs. (1) and (2) above. In FIG. 12, example $ray_j$ 1203 is shown having incrementally extended portion 1206 intersecting the boundary surface of the host gamut 1201 at intersection point 1207. One example illustration of a ray intersecting the boundary surface of a host gamut is shown and discussed with respect to FIG. 3 which shows ray 306 intersecting the boundary surface of host gamut 301 at intersection point 307 at angle 309. If neither has occurred then $ray_j$ is extended again and the process repeats until $ray_j$ has either intersected the boundary of the L*a*b* cube wherein the host gamut resides (step 512), or $ray_j$ has intersected the boundary surface of the host gamut (step 516). One of either, as shown in FIGS. 11 and 12, will eventually occur. It should be appreciated that seed-mapped colors may reside inside the boundary surface of the host gamut and thus their respective rays do not require incremental extensions. The point where $ray_j$ intersects the boundary surface of the host gamut (shown by way of intersection point 1207) is referred to herein as host-mapped color (or host-color) $x_{hj}$. Host-mapped color $x_{hj}$ is the color at the end of $ray_j$ at the point of intersection with the boundary surface of the host gamut. Host-mapped color $x_{hj}$ has corresponding target L*a*b* values. As shown in FIG. 12, before extension $ray_j$ 1203 had start point 1205 (node color $x_j$) and end point 1205 (seed-mapped color $x_j$). After extension, $ray_j$ has been extended (as shown by extension portion 1206) such that $ray_j$ intersects the boundary surface of host gamut 1201 at intersection point 1207 (host-mapped color $x_{hj}$). The entire $ray_j$ from node color $x_j$ to host-mapped color $x_{hj}$ is represented by the notation: $<x_j-x_{hj}>$. Each seed-mapped color $x_{sj}$ and host-mapped color $x_{hj}$ for $ray_j$ together comprise a seed-host pair represented herein by the notation: $<x_{sj}-x_{hj}>$. The seed-host pair is that portion of $ray_j$ (at 1206) between seed-mapped color point ($x_{sj}$) 1204 and host-mapped color point ($x_{hj}$) 1207.

At step 518, a distance $d_j$ is calculated between seed-host pair $<x_{sj}-x_{hj}>$. The distance is a metric for determining an amount of a color difference between two colors in a given color space. This distance is shown by way of example in FIG. 12. The distance can be Euclidean, deltaE2000, or any other equivalent color distance metric CIECAM02. Generally, a Euclidean distance between two colors in L*a*b* space having coordinates expressed in terms of {L*, a*, b*} is given by:

$$\Delta E^*_{ab} = \sqrt{(\Delta L^*)^2 + (\Delta a^*)^2 + (\Delta b^*)^2}. \quad (3)$$

In a cylindrical coordinate representation of L*a*b* space, if we take the lightness L* as the vertical axis then, in a polar orthogonal space, the hue h* is measured counter-clockwise from the positive a* axis (different to the HLS or HSV hue H) and the chroma C* is the perpendicular distance to the L* axis. In such a cylindrical representation, the Euclidean distance between two colors $x_1$ and $x_2$ having coordinates {$L^*_1$, $h^*_1$, $C^*_1$} and {$L^*_2$, $h^*_2$, $C^*_2$}, respectively, is given by:

$$\Delta E^*_{ab} = \sqrt{(\Delta L^*)^2 + C^*_1 + C^*_2 - C^*_1 C^*_2 \cos(h^*_2 - h^*_2)}. \quad (4)$$

In one embodiment, the Euclidean distance $d_j$ is given by:

$$d_j = \sqrt{(L^*_{sj} - L^*_{hj})^2 + (a^*_{sj} - a^*_{hj})^2 + (b^*_{sj} - b^*_{hj})^2}. \quad (5)$$

where $j = 1 \ldots N_p$ and $N_p$ is the number of seed-host pairs, $x_{sj}$ is a seed-mapped color point having L*a*b* values with coordinates {$L^*_{sj}$, $a^*_{sj}$, $b^*_{sj}$} and $x_{hj}$ is the host-mapped color point having L*a*b* values with coordinates {$L^*_{hj}$, $a^*_{hj}$, $b^*_{hj}$}.

At step 520, a determination is made whether any more node colors remain to be processed. If so, then processing repeats with respect to node C of FIG. 5 wherein a next node color is selected from the set of node colors. A ray is traced between that node color and its corresponding seed-mapped color. The ray is incrementally extended until the ray either intersects the boundary of the L*a*b* cube wherein the host gamut resides, or intersects the boundary surface of the host gamut. After each incremental extension, a determination is made whether the ray has intersected anything. Rays which are determined to have intersected the boundary of the L*a*b* cube wherein the host gamut resides have the respective L*a*b* values of their node colors added to the set of outliers (step 514). Outlier colors are mapped as discussed herein further with respect to step 534. If a ray intersects the boundary surface of the host gamut then a distance is calculated for the ray's seed-host pair (step 518). Processing repeats until all selected node colors selected in step 506 have been processed. Once all node colors have been processed then processing proceeds with respect to node D of FIG. 7.

Figure 7:
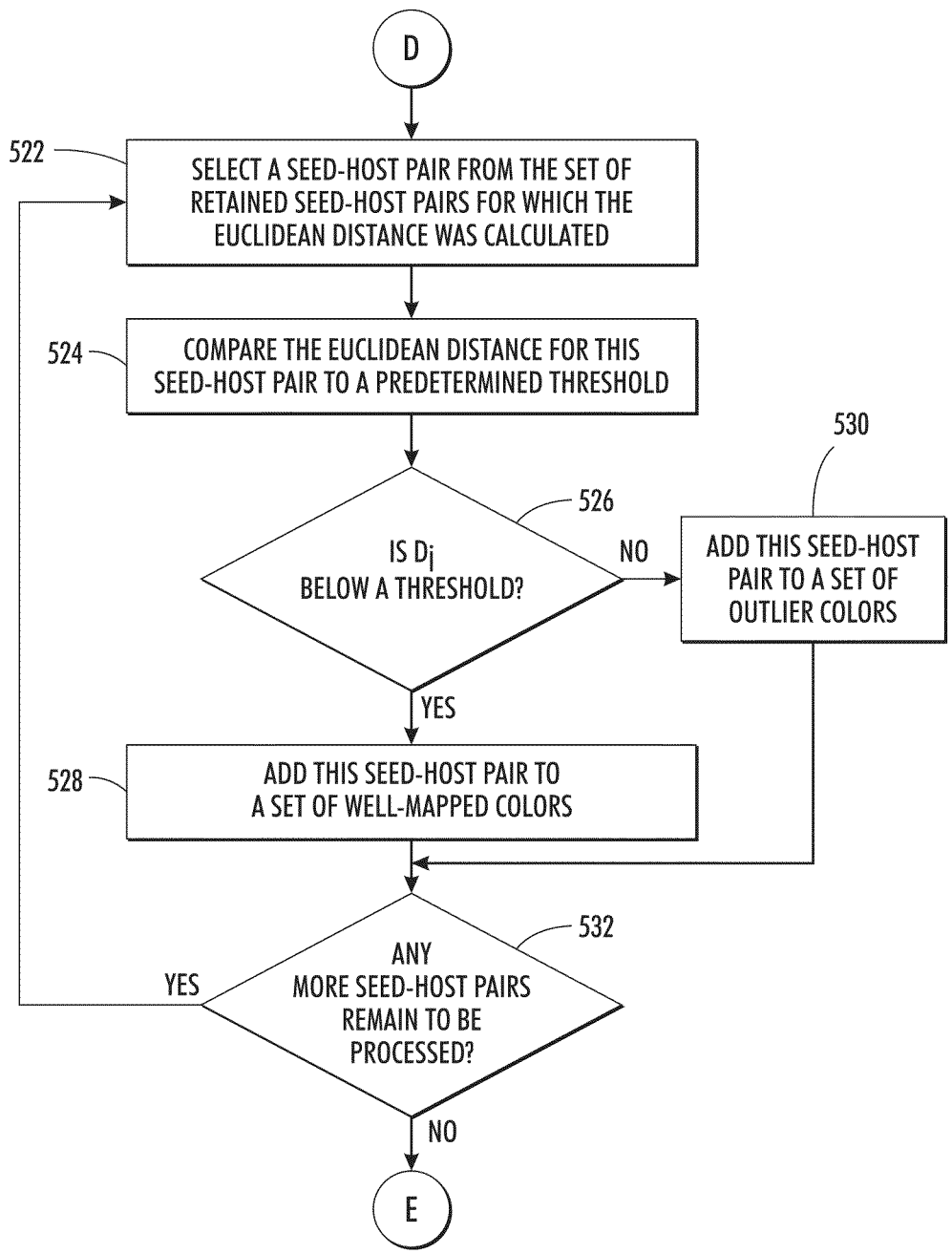
FIG. 7 is a continuation of the flow diagram of FIG. 6 with flow processing continuing with respect to node D.

Reference is now being made to the flow diagram of FIG. 7 which is a continuation of the flow diagram of FIG. 6, with flow processing continuing with respect to node D.

At step 522, a first seed-host pair $<x_{sj}-x_{hj}>$ is selected from the set of seed-host pairs (determined in step 516) for processing.

At step 524, for this selected seed-host pair, the corresponding distance $d_j$, (calculated for this seed-host pair in step 518), is compared against a pre-determined threshold.

At step 526, a determination is made whether this distance is below the pre-determined threshold. In one embodiment, this involves determining whether distance $d_j$ is within a defined number of standard deviations of a mean of a Gaussian distribution of the distances calculated for each seed-host pair, the number of standard deviations being defined by the threshold. In one embodiment, this comprises:

$$\mu = \frac{1}{N} \sum_{j=1}^{N} d_j, \quad (6)$$

$$\sigma^2 = \frac{1}{N-1} \sum_{j=1}^{N} (d_j - \mu)^2, \quad (7)$$

$$\alpha = (i \forall d_j) > (\text{Threshold} \cdot \sigma), \quad (8)$$

where $\mu$ is the mean, $\sigma^2$ is the variance, $\sigma$ is the standard deviation, and $\alpha$ is an index of a seed-host pair which is within a pre-defined number of standard deviations. If, for example, the threshold is set to a value equal to 3, then the distance calculated for a given seed-host pair would have to fall within $3\sigma$ of the mean of the distribution of all distances calculated in step 518 in order for this seed-host pair to be considered part of the set of well-mapped colors. Otherwise, the seed-host pair is considered part of the set of outlier colors. In various embodiments, the set of well-mapped colors and the set of outlier colors can be saved to a file or stored in a record in a database or otherwise saved to a storage device or in a memory for subsequent retrieval. Often the histogram of distance calculated for seed-host pairs may not result in normal distribution and hence the use of standard deviation for separating colors into outliers may not work well. Hence, other statistical methods such as box-and-whisker approach may be considered useful and will be equally applicable to this problem.

At step 528, if the distance for this seed-host pair is below the pre-determined threshold then this seed-host pair's is considered 'well-mapped' and their respective L*a*b* values are added to a set of well-mapped colors. Each color in the set of well-mapped colors is referred to herein as well-mapped color $x_{wk}$, where k=1 . . . $N_w$, and $N_w$ is the number of well-mapped colors in the set of well-mapped colors.

At step 530, if the distance for this seed-host pair is not below the pre-determined threshold then this seed-host pair's respective L*a*b* values are added to a set of outlier colors. Each color in the set of outlier colors is referred to as outlier color $x_{ot}$, where t=1 to $N_{out}$ where $N_{out}$ is the total number of outlier colors.

At step 532, a determination is made whether any more seed-host pairs remain to be processed. If so, then processing repeats with respect to step 522 wherein a next seed-host pair is selected. The distance calculated for this particular seed-host pair is compared against the predetermined threshold. As a result of that comparison, the L*a*b* values of the node color of this seed-host pair is either added to the set of outlier colors or is added to the set of well-mapped colors. Processing repeats until all the selected seed-host pairs have been processed. Thereafter, processing continues with respect to node E of FIG. 8.

Figure 8:
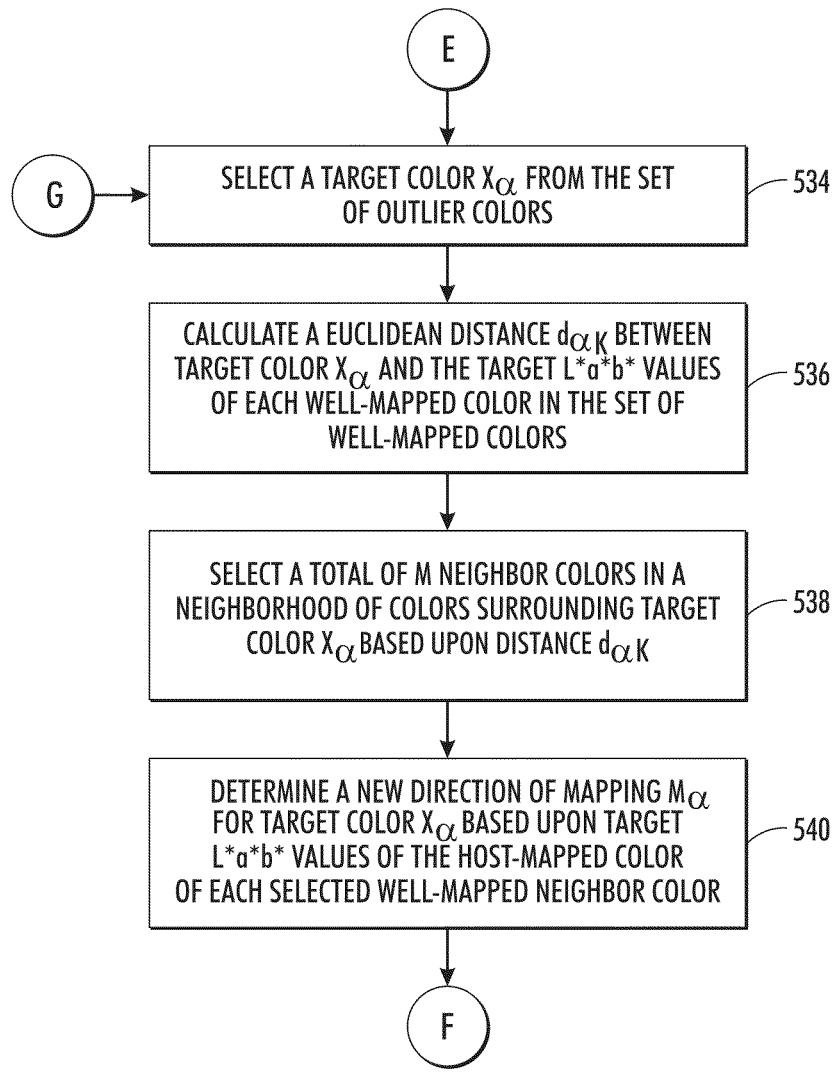
FIG. 8 is a continuation of the flow diagram of FIG. 7 with flow processing continuing with respect to node E.

Reference is now being made to the flow diagram of FIG. 8 which is a continuation of the flow diagram of FIG. 7 with flow processing continuing with respect to node E.

At step 534, a color $x_\alpha$ is selected from the set of outlier colors. A new direction of mapping is to be determined for example selected outlier color $x_\alpha$ shown at 1402 of FIG. 14. The following steps are iteratively repeated for each of a desired number of outlier colors. Outliers include orphan colors (step 514).

Figure 14:
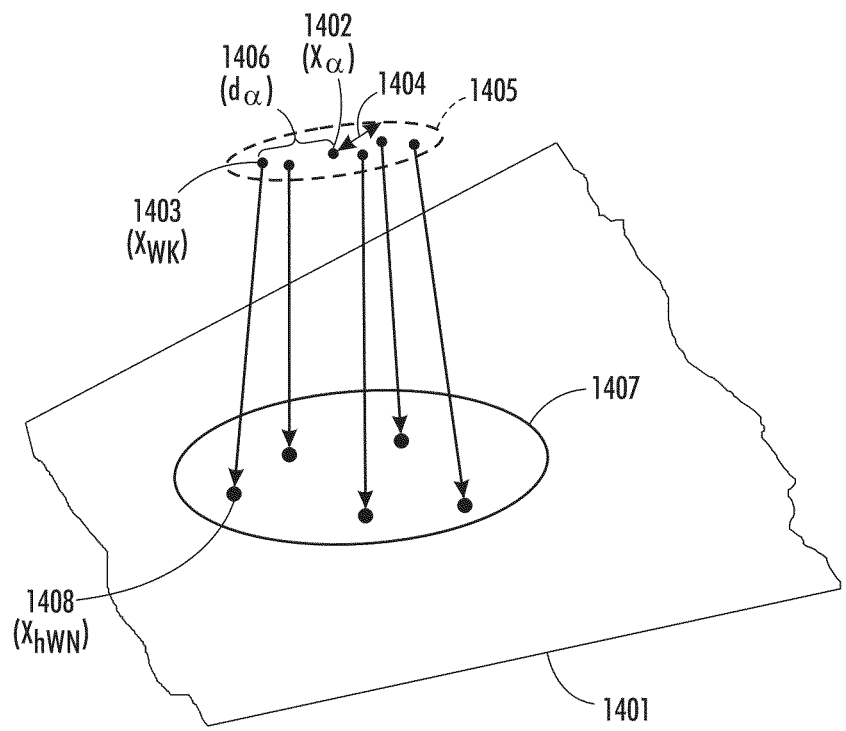
FIG. 14 shows a set of well-mapped colors 1400 and a selected set of well-mapped neighbor colors 1405 and a target color $x_\alpha$ (1402)

At step 536, a distance $d_{\alpha k}$ is calculated between the L*a*b* values of color $x_\alpha$ and the L*a*b* values of each well-mapped color $x_{wk}$ in the set of well-mapped colors. FIG. 14 shows one example distance $d_{\alpha k}$ (1406) calculated between color $x_\alpha$ 1402 and example well-mapped color $x_{wk}$ 1403. In one embodiment, distance $d_{\alpha k}$ is given by:

$$d_{\alpha k} = \sqrt{(L^*_\alpha - L^*_{wk})^2 + (a^*_\alpha - a^*_{wk})^2 + (b^*_\alpha - b^*_{wk})^2}, \quad (9)$$

for k=1 . . . $N_w$, where $N_w$ is the number of well-mapped colors, color $x_\alpha$ has target L*a*b* values with coordinates $\{L^*_\alpha, a^*_\alpha, b^*_\alpha\}$, and well-mapped color $x_{wk}$ has target L*a*b* values with coordinates $\{L^*_{wk}, a^*_{wk}, b^*_{wk}\}$.

At step 538, a total of M neighbor colors are selected from the set of well-mapped colors based upon distance $d_{\alpha k}$, (step 536). A well-mapped color is considered to be a neighbor of color $x_\alpha$ if the distance between them is less than a predetermined distance. One example pre-determined distance which defines the neighborhood around color $x_\alpha$ 1402 is shown at 1404. Distance 1406 calculated between color $x_\alpha$ 1402 and well-mapped color 1403 is less than distance 1404 which defines the neighborhood 1405 of colors surrounding $x_\alpha$. A well-mapped color determined to be in a neighborhood surrounding color $x_\alpha$ is referred to as well-mapped neighbor color $x_{wn}$, where n=1 to M. Each well-mapped neighbor color in neighborhood 1405 maps to a corresponding well-mapped on-the-host color (shown in area 1407) on the boundary surface of host gamut 1401. One example well-mapped neighbor color ($x_{wn}$) 1403 surrounding color $x_\alpha$, maps to well-mapped on-the-host color ($x_{hwn}$) 1408 on the boundary surface of host gamut 1401. It should be appreciated that $x_{wn}$ is the target node color of a neighbor color and $x_{hwn}$ is its respective mapped value on the boundary surface of the host gamut.

At step 540, a new direction of mapping $m_\alpha$ is determined for color $x_\alpha$. In one embodiment, the new direction of mapping is based upon the target L*a*b* values of the well-mapped on-the-host colors in region 1407 of host gamut 1401. In one embodiment, the new direction of mapping $m_\alpha$, comprises the following:

$$d_{hn} = \sqrt{(L^*_{hwn} - L^*_{wn})^2 + (a^*_{hwn} - a^*_{wn})^2 + (b^*_{hwn} - b^*_{wn})^2}, \quad (10)$$

$$m_\alpha = \sum_{n=1}^{M} \frac{\left(\frac{d_{\alpha n}}{\sum_{m=1}^{M} d_{\alpha m}}\right)}{d_{hn}} \begin{bmatrix} L^*_{hwn} - L^*_{wn} \\ a^*_{hwn} - a^*_{wn} \\ b^*_{hwn} - b^*_{wn} \end{bmatrix}, \quad (11)$$

for n=1 . . . M, m=1 . . . M, where M is the number of well-mapped neighbor colors, and where well-mapped on-the-host color $x_{hwn}$ has L*a*b* values with coordinates $\{L^*_{hwn}, a^*_{hwn}, b^*_{hwn}\}$ and well-mapped neighbor color $x_{wn}$ has L*a*b* values with coordinates $\{L^*_{wn}, a^*_{wn}, b^*_{wn}\}$. Once the new direction of mapping $m_\alpha$ has been determined for color $x_\alpha$, processing proceeds with respect to node F of FIG. 9.

Figure 9:
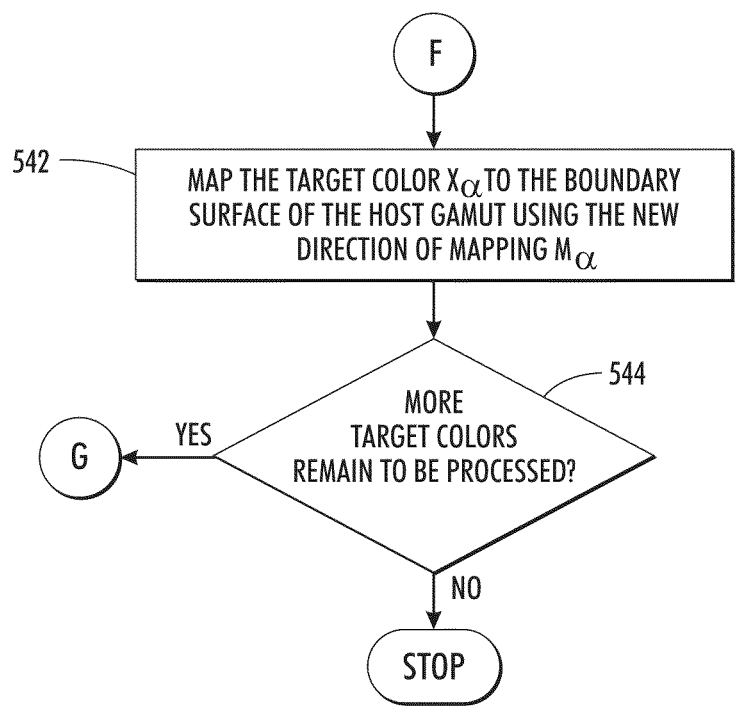
FIG. 9 is a continuation of the flow diagram of FIG. 8 with flow processing continuing with respect to node F.
Figure 10:
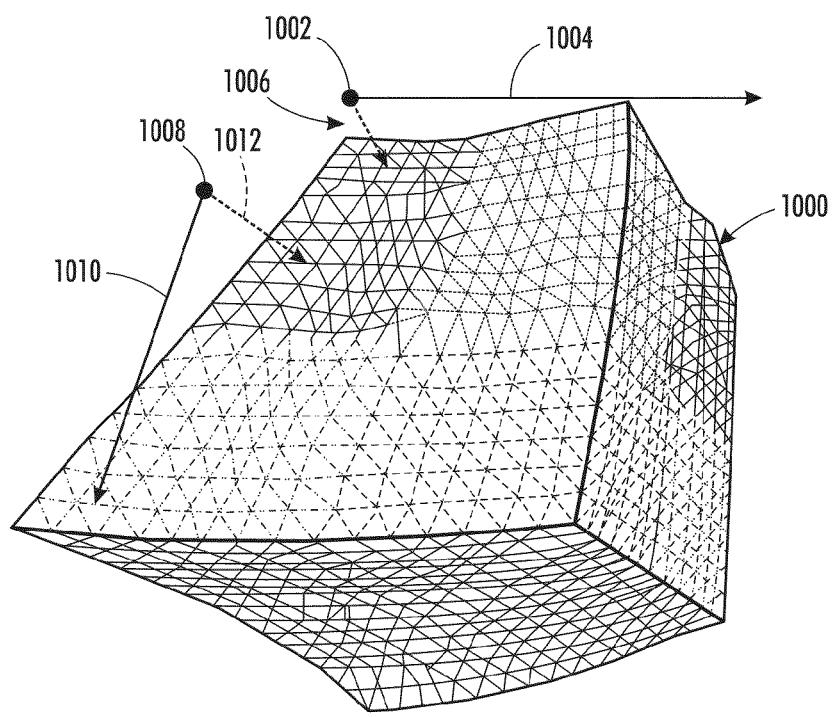
FIG. 10 is a further illustration of FIG. 4.

Reference is now being made to the flow diagram of FIG. 9 which is a continuation of the flow diagram of FIG. 8 with flow processing continuing with respect to node F.

Figure 15:
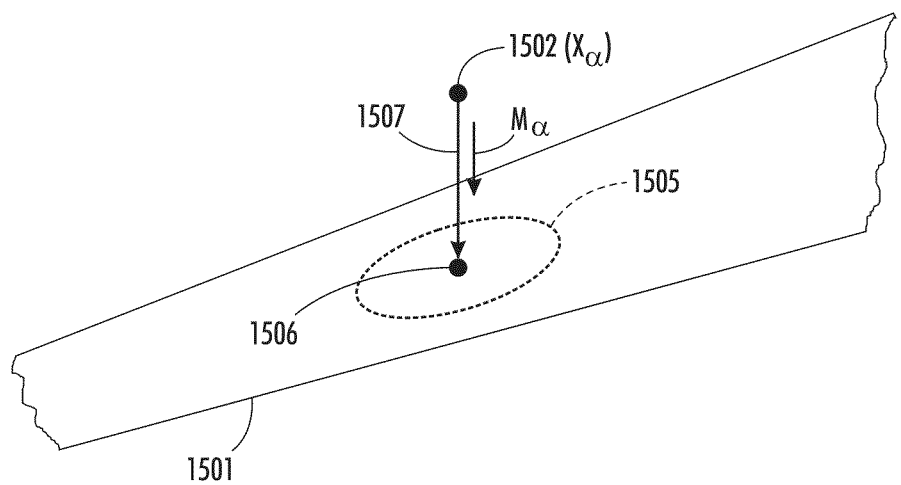
FIG. 15 shows a ray 1507 traced between a target color 1502 to intersection point 1506 on the surface of host gamut 1501.

At step 542, color $x_\alpha$ is mapped to the boundary surface of the host gamut using the new direction of mapping $m_\alpha$. Mapping this color point is effectuated by tracing a ray from color $x_\alpha$ and extending the ray in the new direction of mapping until the ray intersects the boundary surface of the host gamut. FIG. 15 shows an example ray 1507 traced from color ($x_\alpha$) 1502 in the new direction of mapping (shown by arrow $m_\alpha$) to intersection color point 1506 with area 1505 on a boundary surface of host gamut 1501.

At step 544, a determination is made whether any more colors remain to be selected from the set of outlier colors. If so, then processing repeats with respect to node G of FIG. 8 wherein a next target color $x_\alpha$ is selected from the set of outlier colors. A distance is then calculated between this target color $x_\alpha$ and the target L*a*b* values of each well-mapped color in the set of well-mapped colors. Well-mapped colors which are determined to be within a predetermined distance from color $x_\alpha$ are considered well-mapped neighbor colors. A new direction of mapping is determined for color $x_\alpha$ based upon the target L*a*b* values of the host-mapped color of each well-mapped neighbor color. This color $x_\alpha$ is mapped to the boundary surface of the host gamut using the new direction of mapping. Processing repeats until all desired colors in the set of outlier colors have been processed. Thereafter, processing stops.

The teachings hereof are intended to find their implementations in an image processing system or color management system which may, in turn, be placed in the image path of a digital document reproduction system. Those skilled in the art will appreciate that the teachings hereof may be practiced with other system configurations, including multi-processor systems, microprocessor-based or programmable devices, networked PCs, minicomputers, mainframe computers, hand-held devices, and the like. Certain aspects of such a system would operate in accordance with pre-programmed instructions to carry out the methods disclosed herein. Such a system might include a commercially available graphics rendering capability that can also be associated with a networked storage medium or similar memory devices accessible via an Internet or intranet. It is also contemplated that one or more aspects of the present method may be implemented on a dedicated computer system or workstation, and may also be practiced in distributed computing environments where tasks are performed by remote processing devices that are linked through a communication network. In a distributed computing environment, program modules for performing various aspects of the present system and method. Generally, various modules include routines, objects, components, etc., that perform particular tasks. Data structures may likely be employed to implement particular abstract data types as are well known in the programming arts to store variables and data used in various of the computations described herein. Such a system may be incorporated, in whole or in part, within an image output device or may be a separate system altogether such as, for instance, ASIC, DFE, or a standalone API. An image processing system would include a processor capable of reading machine-executable instructions stored in an addressable memory (or processor cache) or local storage device and executing those instructions to perform various aspects of the present gamut mapping method. Other embodiments include a special purpose computer designed to perform the methods disclosed herein.

Figure 16:
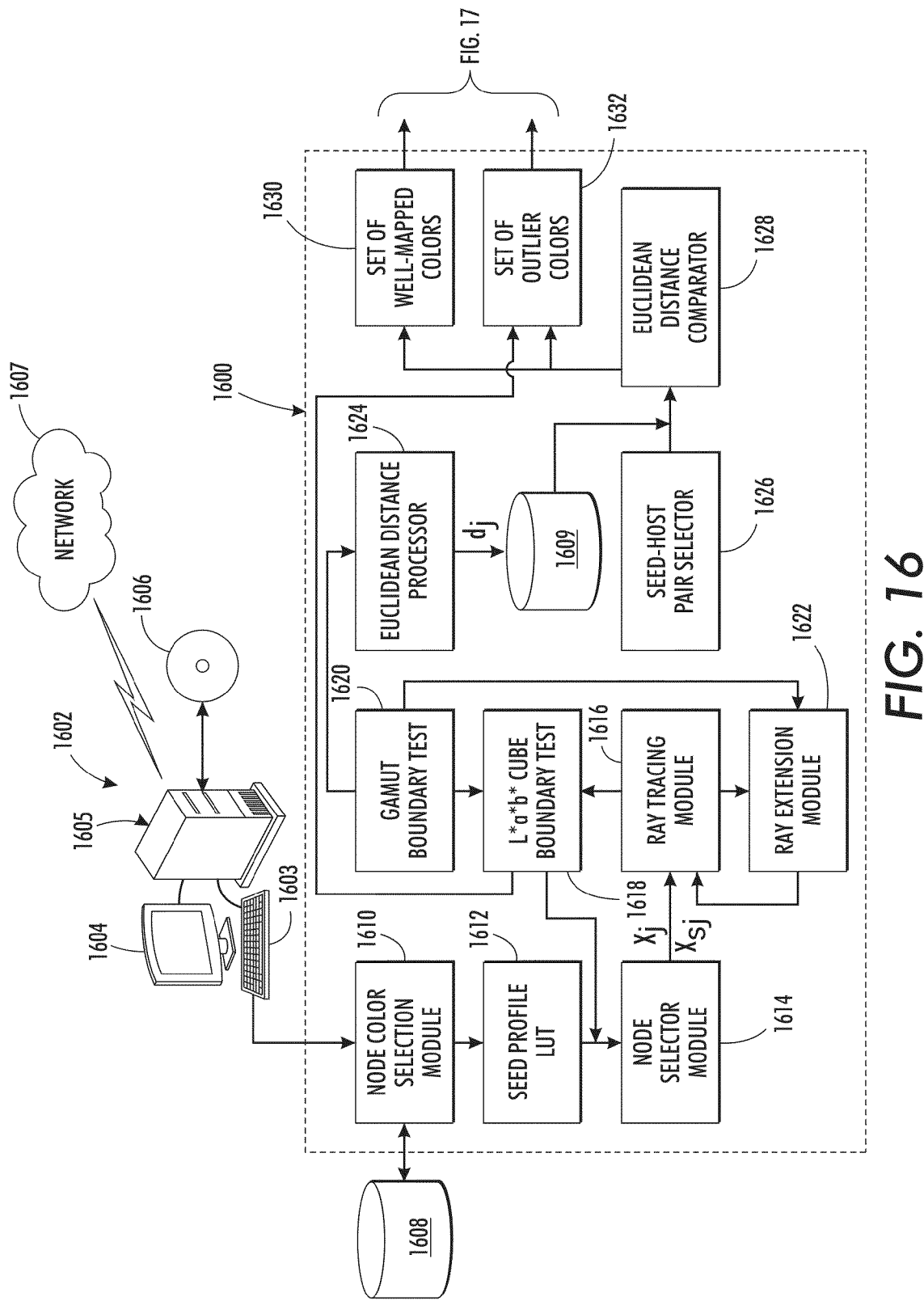
FIG. 16 is a block diagram of an example image processing system which receives a host profile LUT of a host device and wherein various aspects of the present gamut mapping method are performed in a manner as described with respect to the flow diagrams of FIGS. 5-9.

Reference is now being made to FIG. 16 which is a block diagram of an example image processing system 1600 which receives a destination profile LUT of a host device and wherein various aspects of the present gamut mapping method are performed in a manner as described with respect to the flow diagrams of FIGS. 5 and 9.

The illustrated embodiment shown generally comprises a computer workstation 1602 which includes a keyboard 1603, monitor 1604, case 1605 housing a motherboard, processor, hard drive, CD-ROM drive, and a network interface card (not shown), and a rewriteable media 1606 for storing executable machine readable program instructions and data. Computer workstation 1602 is in communication with one or more devices over network 1607, including storage devices 1608, 1609, and 1637 (of FIG. 17), which may be the same device or memory. Any of the storage devices may comprise memory, cache memory, ROM/RAM, a database system, or a remote device accessible over network 1607. Node color selector module 1610 samples colors along axes of a color space over a number of nodes to obtain a set of node colors as described above with respect to step 502 of the flow diagram of FIG. 5. Such a sampling may be performed using either a hardware or software or by receiving color values from storage device 1608.

Node Color Selection Module 1610 identifies a total of N number of node colors which have respective target L*a*b* values that are both outside a boundary surface of a seed gamut of a seed device and outside a boundary surface of a host gamut of a host device. Node colors selected for processing can be retrieved from storage device 1608 or selected by a user using the graphical interface of workstation 1602 and thereafter stored in storage device 1608. Seed profile LUT module 1612 receives target L*a*b* values of each selected node color and generates a corresponding seed-mapped color. The seed-mapped color is provided to Node Selector Module 1614 wherein a first node color $x_j$ is selected for processing. The selected node color is provided to Ray Tracing Module 1616 wherein a ray is traced between node color $x_j$ and the corresponding seed-mapped color $x_{sj}$. The ray has the L*a*b* values of the node color as a start point and the L*a*b* values of the seed-mapped color as an end point. Lab Cube Boundary Test Module 1618 receives points of the ray and test the endpoint of the ray to determine whether the ray has intersected the boundary of the L*a*b* cube wherein the host gamut resides. If the ray has intersected the boundary of the L*a*b* cube then the target L*a*b* values of the node color for this ray are provided to Outlier Color Module 1632 which constructs a set of outlier colors for further processing herein and control passes to Node Selector Module 1614 wherein a next node color is selected for processing. If the ray has not yet intersected the boundary of the L*a*b* cube then control passes to Gamut Boundary Test Module 1620 wherein the ray is tested to determine whether the endpoint of the ray has intersected a boundary surface of the host gamut. If the ray has not yet intersected the boundary surface of the host gamut and the ray has not yet intersected the boundary of the L*a*b* cube, then control is passed to Ray Extension Module 1622 wherein the ray is incrementally extended. For each ray, process is iteratively repeated until it has been determined that the ray has intersected either the boundary of the L*a*b* cube or the boundary surface of the host gamut. If the ray has intersected the boundary surface of the host gamut then control passes to Euclidean Distance Processor 1624 which, in one embodiment, calculates a Euclidean distance $d_j$ between this seed-host pair and stores a result of this calculation to storage device 1637. The calculated Euclidean distance and the seed-host pair is stored in storage device 1609. Once all the node colors have been processed, Seed-Host Pair Selector Module 1626 selects a first seed-host pair from the set of seed-host pairs stored in storage device 1609. For the selected seed-host pair, control passes to Euclidean Distance Comparator Module 1628 which retrieves the Euclidean distance calculated for this seed-host pair from storage device 1637 and compares this distance against a pre-determined threshold. If the distance calculated for this seed-host pair is below the predetermined threshold then this seed-host pair's respective L*a*b* values are considered well-mapped and are provided to Well-Mapped Color Module 1630 which adds these values to a set of well-mapped colors. If the distance for this seed-host pair is not below the threshold then the node color for this seed-host pair is considered an outliers and are provided to Outlier Color Module 1632 which adds these values to the set of outliers. Embodiments for comparing the distances for a given seed-host pair and adding seed-host pairs to the set of well-mapped colors or the set of outlier colors are described above with respect to the flow diagram of FIG. 7. Processing repeats until all seed-host pairs have been processed. Thereafter, gamut mapping system 1600 continues onto FIG. 17. It should be appreciated that, if the distance is calculated according to another metric such as, for example, deltaE2000, then the associated modules would calculate the distance accordingly.

Target Color Selector Module 1634 retrieves a first color $x_\alpha$ from the set of outlier colors generated by Outlier Color Module 1632. Euclidean Distance Calculator 1636 determines distance between the L*a*b* values of color $x_\alpha$ and the target L*a*b* values of each well-mapped color in the set of well-mapped colors created by module 1630. The calculated distances for each are saved to storage device 1637. Distance Comparator Module 1638 retrieves the distances stored in storage device 1637 and compares each distance against a predetermined threshold. As a result of this comparison, Comparator Module 1638 identifies well-mapped neighbor colors from the set of well-mapped colors which are in a neighborhood of colors surrounding color $x_\alpha$. Well-mapped neighbor colors are provided to Direction of Mapping Processor 1640 which determines a new direction of mapping for the selected target color based upon the target L*a*b* values of the host-mapped color of each well-mapped neighbor color. The new direction of mapping $m_\alpha$ for color $x_\alpha$ is provided to Gamut Mapping Module 1642 which maps color $x_\alpha$ in the new direction of mapping to the boundary surface of the host gamut of host device 1644 and further stores the mapping directions to storage device 1646.

Image output device 1644 incorporates a user interface comprising a display and keypad for entering or selecting values. The user interface may further be used to set parameters and control image processing operations. The instructions for these various operations may be input via a touch screen display. Such a system would further include various device controllers and other special purpose computer processors capable of executing machine executable program instructions. Such a device would include one or more network connections for receiving and/or transmitting data over a network via a wire, cable, modem, or wireless device, and may further incorporate a CD-ROM or other storage device wherein a removable media can be inserted and data deposited thereon.

Figure 17:
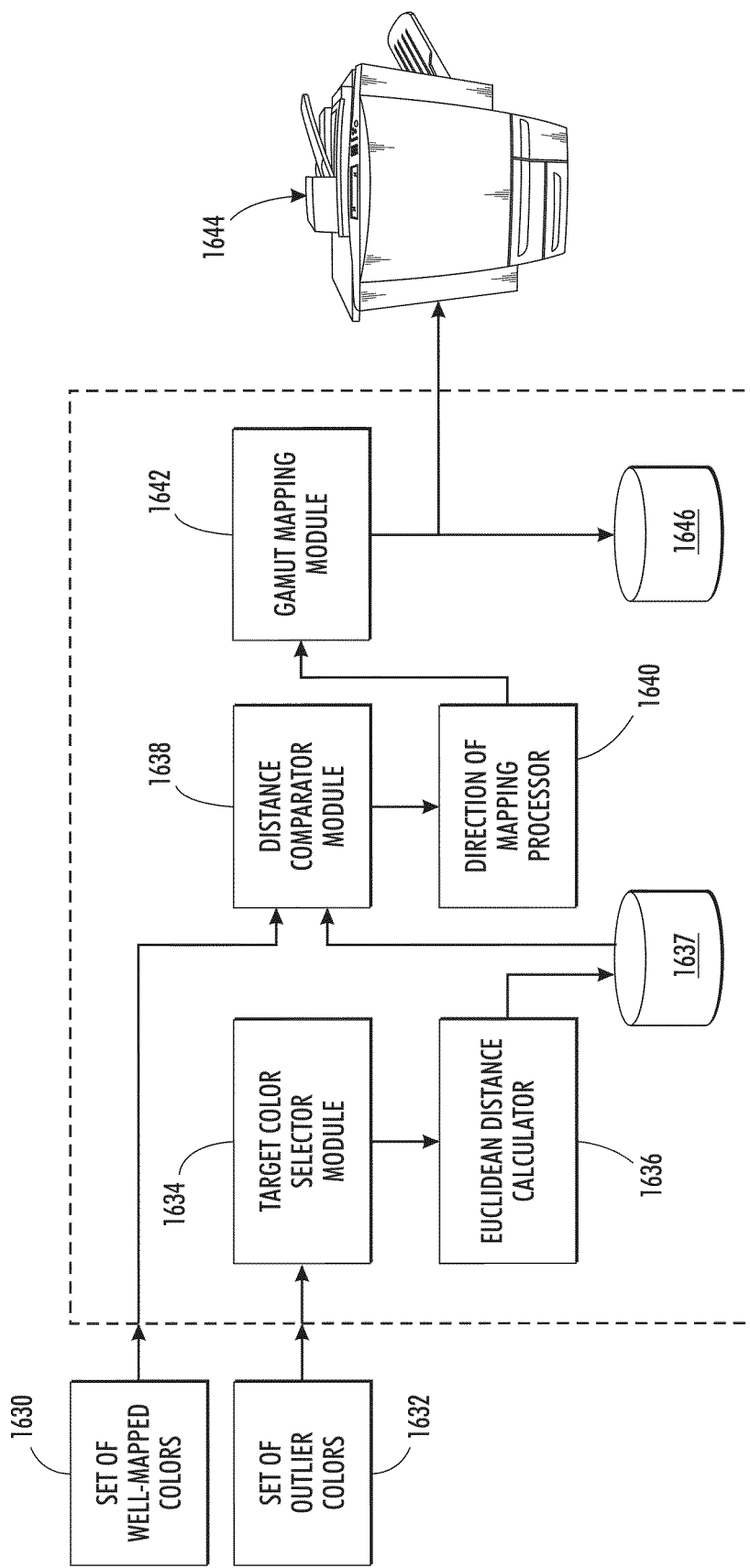
FIG. 17 is a continuation of the block diagram of the image processing system of FIG. 16.
Figure 18:
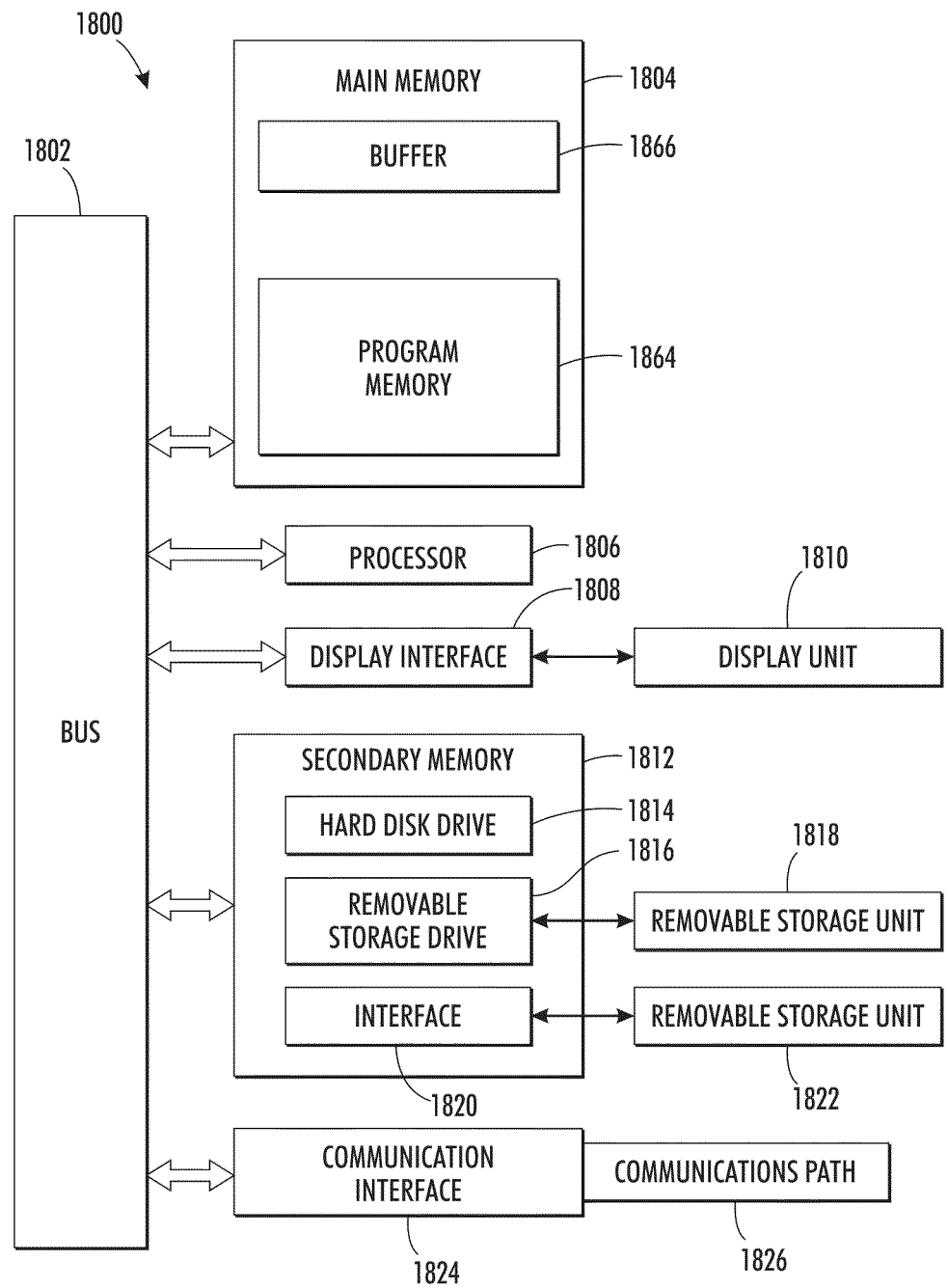
FIG. 18 illustrates a block diagram of one example embodiment of a special purpose computer system for implementing one or more aspects of the present method as described with respect to the embodiments of the flow diagrams hereof.

It should be appreciated that any of the modules and processing units shown and described with respect to the block diagrams of FIGS. 16 and 17 are in communication with computer workstation 1602, and some or all of the functionality described for any of these modules may be performed, in whole or in part, within workstation 1602 or by a special purpose computer system as described with respect to FIG. 18. It should be appreciated that various modules may designate one or more components which may, in turn, each comprise software and/or hardware designed to perform a specific function. A plurality of modules may collectively perform a single function. A module may have a specialized processor capable of reading machine executable program instructions. A module may comprise a single piece of hardware such as an ASIC, electronic circuit, or special purpose processor. A plurality of modules may be executed by either a single special purpose computer system or a plurality of special purpose computer systems in parallel. Connections between modules includes both physical and logical connections. Modules may further include one or more software/hardware modules which may further comprise an operating system, drivers, device controllers, and other apparatuses some or all of which may be connected via a network.

It is also contemplated that one or more aspects of the present method may be implemented on a dedicated computer system or workstation, and may also be practiced in distributed computing environments where tasks are performed by remote processing devices that are linked through a communication network. In a distributed computing environment, program modules for performing various aspects of the present system and method. Other embodiments include a special purpose computer designed to perform the methods disclosed herein.

Reference is now being made to FIG. 18 which illustrates a block diagram of one example embodiment of a special purpose computer system for implementing one or more aspects of the present method as described with respect to the embodiments of the flow diagrams of FIGS. 5-9. Such a special purpose processor is capable of executing machine executable program instructions. The special purpose processor may comprise any of a micro-processor or micro-controller, an ASIC, an electronic circuit, or special purpose computer. Such a computer can be integrated, in whole or in part, with a xerographic system or a color management or image processing system, which includes a processor capable of executing machine readable program instructions for carrying out one or more aspects of the present method. One example embodiment of an image processing system is shown and discussed with respect to the block diagrams of FIGS. 16 and 17.

Special purpose computer system 1800 includes processor 1806 for executing machine executable program instructions for carrying out all or some of the present method. The processor is in communication with bus 1802. The system includes main memory 1804 for storing machine readable instructions. Main memory may comprise random access memory (RAM) to support reprogramming and flexible data storage. Buffer 1866 stores data addressable by the processor. Program memory 1864 stores machine readable instructions for performing the present method. A display interface 1808 forwards data from bus 1802 to display 1810. Secondary memory 1812 includes a hard disk 1814 and storage device 1816 capable of reading/writing to removable storage unit 1818, such as a floppy disk, magnetic tape, optical disk, etc. Secondary memory 1812 may further include other mechanisms for allowing programs and/or machine executable instructions to be loaded onto the processor. Such mechanisms may include, for example, a storage unit 1822 adapted to exchange data through interface 1820 which enables the transfer of software and data. The system includes a communications interface 1824 which acts as both an input and an output to allow data to be transferred between the system and external devices such as a color scanner (not shown). Example interfaces include a modem, a network card such as an Ethernet card, a communications port, a PCMCIA slot and card, etc. Software and data transferred via the communications interface are in the form of signals. Such signal may be any of electronic, electromagnetic, optical, or other forms of signals capable of being received by the communications interface. These signals are provided to the communications interface via channel 1826 which carries such signals and may be implemented using wire, cable, fiber optic, phone line, cellular link, RF, memory, or other means known in the arts.

It should be understood that the flow diagrams depicted herein are illustrative. One or more of the operations illustrated in any of the flow diagrams may be performed in a differing order. Other operations, for example, may be added, modified, enhanced, condensed, integrated, or consolidated. Variations thereof are envisioned, and are intended to fall within the scope of the appended claims. All or portions of the flow diagrams may be implemented partially or fully in hardware in conjunction with machine executable instructions in communication with various components of such a system. The methods described can be implemented on a special purpose computer, a micro-processor or micro-controller, an ASIC or other integrated circuit, a DSP, an electronic circuit such as a discrete element circuit, a programmable device such as a PLD, PLA, FPGA, PAL, PDA, and the like. In general, any device capable of implementing a finite state machine, that is in turn capable of implementing one or more elements of the flow diagrams provided herewith, or portions thereof, can be used. The teachings hereof can be implemented in hardware or software using any known or later developed systems, structures, devices, and/or software by those skilled in the applicable art without undue experimentation from the functional description provided herein with a general knowledge of the relevant arts. Moreover, the methods hereof may be readily implemented as software executed on a programmed general purpose computer, a special purpose computer, a microprocessor, or the like. In this case, the methods hereof can be implemented as a routine embedded on a personal computer or as a resource residing on a server or workstation, such as a routine embedded in a plug-in, a photocopier, a driver, a scanner, a photographic system, a xerographic device, or the like.

One or more aspects of the methods described herein are intended to be incorporated in an article of manufacture, including one or more computer program products, having computer usable or machine readable media. For purposes hereof, a computer usable or machine readable media is, for example, a floppy disk, a hard-drive, memory, CD-ROM, DVD, tape, cassette, or other digital or analog media, or the like, which is capable of having embodied thereon a computer readable program, one or more logical instructions, or other machine executable codes or commands that implement and facilitate the function, capability, and methodologies described herein. Furthermore, the article of manufacture may be included on at least one storage device readable by a machine architecture or other xerographic or image processing system embodying executable program instructions capable of performing the methodology described in the flow diagrams. Additionally, the article of manufacture may be included as part of a xerographic system, an operating system, a plug-in, or may be shipped, sold, leased, or otherwise provided separately, either alone or as part of an add-on, update, upgrade, or product suite.

It will be appreciated that various of the above-disclosed and other features and functions, or alternatives thereof, may be desirably combined into many other different systems or applications. Various presently unforeseen or unanticipated alternatives, modifications, variations, or improvements therein may become apparent and/or subsequently made by those skilled in the art, which are also intended to be encompassed by the following claims. Accordingly, the embodiments set forth above are considered to be illustrative and not limiting.

Various changes to the above-described embodiments may be made without departing from the spirit and scope of the invention. The teachings of any printed publications including patents and patent applications, are each separately hereby incorporated by reference in their entirety.

What is claimed is:

1. A method for mapping out-of-gamut colors to a gamut of a host device, the method comprising:
  identifying a total of $N_p$ seed-host pairs, each pair comprising a seed-mapped color $x_s$ and a host-mapped color $x_h$, each seed-mapped color corresponding to a node color having respective target L*a*b* values, wherein identifying said seed-host pairs comprises;
   identifying a total of $N_c$ node colors where $N_c \geq N_p$ each node color being both outside a boundary surface of a seed gamut of a seed device and outside a boundary surface of a host gamut of a host device, each node color having respective target L*a*b* values; and
   for each node color $x_j$, where $j=1 \ldots N_c$:
    passing the target L*a*b* values of node color $x_j$ through a seed profile of the seed device to obtain corresponding seed-mapped color $x_{sj}$;
    tracing a ray$_j$ between node color $x_j$ and seed-mapped color $x_{sj}$, a slope of ray$_j$ defining a direction of mapping $m_j$ between $x_j$ and $x_{sj}$; and
    extending ray$_j$ in the direction of mapping until ray$_j$ either intersects a boundary surface of the host gamut or intersects a boundary of the L*a*b* cube wherein the host gamut resides, the point of intersection with the boundary surface of the host gamut being host-mapped color $x_h$, each seed-mapped color $x_{sj}$ and host-mapped color $x_{hj}$ comprising a seed-host pair;
  for each of said identified seed-host pair, $x_{sj}$ and $x_{hj}$, where $j=1 \ldots N_p$:
    calculating a distance $d_j$ between seed-mapped color $x_{sj}$ and host-mapped color $x_{hj}$;
    comparing $d_j$ to a pre-determined threshold; and
    in response to $d_j$ being below the pre-determined threshold, adding the target L*a*b* values of this seed-mapped color's respective node color to a set of well-mapped color, otherwise adding the target L*a*b* values of this seed-mapped color's respective node color to a set of outlier colors;
  selecting at least one color $x_\alpha$ from the set of outlier colors;
  determining a new direction of mapping for color $x_\alpha$ using the target L*a*b* values of well-mapped on-the-host colors selected from the set of well-mapped neighbor colors; and
  mapping color $x_\alpha$ to a boundary surface of a host gamut of a host device using the new direction of mapping.

2. The method of claim 1, wherein ray$_j$ traced between $x_j$ and $x_{sj}$ comprises:

$$x = x_j + m_j i,$$

$$m_j = \frac{1}{\sqrt{(L^*_{sj} - L^*_j)^2 + (a^*_{sj} - a^*_j)^2 + (b^*_{sj} - b^*_j)^2}} \begin{bmatrix} L^*_{sj} - L^*_j \\ a^*_{sj} - a^*_j \\ b^*_{sj} - b^*_j \end{bmatrix},$$

where $m_j$ is the slope of ray$_j$, i is an index of the points of the line, $x_j$ has L*a*b* values with coordinates $\{L^*_j, a^*_j, b^*_j\}$, and $x_{sj}$ has L*a*b* values with coordinates $\{L^*_{sj}, a^*_{sj}, b^*_{sj}\}$.

3. The method of claim 1, further comprising, in response to ray$_j$ having intersected a boundary of the L*a*b* cube, adding the respective L*a*b* values of node color $x_j$ to the set of outliers.

4. The method of claim 1, wherein distance $d_j$ is Euclidean and comprises:

$$d_j = \sqrt{(L^*_{sj} - L^*_{hj})^2 + (a^*_{sj} - a^*_{hj})^2 + (b^*_{sj} - b^*_{hj})^2},$$

where $x_{sj}$ has L*a*b* values with coordinates $\{L^*_{sj}, a^*_{sj}, b^*_{sj}\}$ and $x_{hj}$ has L*a*b* values with coordinates $\{L^*_{hj}, a^*_{hj}, b^*_{hj}\}$.

5. The method of claim 1, wherein comparing distance $d_j$ to a pre-determined threshold, comprises determining whether $d_j$ is within a defined number of standard deviations of a mean of a Gaussian distribution of distances $d_j$, the number of standard deviations being defined by said pre-determined threshold, the mean and the standard deviation comprising:

$$\mu = \frac{1}{N} \sum_{j=1}^{N} d_j,$$

$$\sigma^2 = \frac{1}{N-1} \sum_{j=1}^{N} (d_j - \mu)^2, \text{ and}$$

$$\alpha = (i \forall d_j) > (\text{Threshold} \cdot \sigma).$$

6. The method of claim 1, wherein determining a new direction of mapping for color $x_\alpha$ comprises:
  for each well-mapped color $x_{wk}$, where $k=1 \ldots N_w$, and $N_w$ is the number of well-mapped colors in the set of well-mapped colors, calculating, a distance $d_{\alpha k}$ between selected color $x_\alpha$ and the L*a*b* values of well-mapped color $x_{wk}$; and selecting a total of M well-mapped neighbor colors from the set of well-mapped colors, each well-mapped neighbor color $x_{wn}$ being in a neighborhood of colors surrounding color $x_\alpha$ as defined by $d_{\alpha k}$, each of said well-mapped neighbor colors $x_{wn}$ having a respective well-mapped on-the-host color $x_{hwn}$.

7. The method of claim 6, further comprising:

$$m_\alpha = \sum_{n=1}^{M} \left( \frac{\frac{\sum_{m=1}^{M} d_{am}}{d_{hn}}}{d_{hn}} \right) \begin{bmatrix} L^*_{hwn} - L^*_{wn} \\ a^*_{hwn} - a^*_{wn} \\ b^*_{hwn} - b^*_{wn} \end{bmatrix},$$

$$d_{hn} = \sqrt{(L^*_{hwn} - L^*_{wn})^2 + (a^*_{hwn} - a^*_{wn})^2 + (b^*_{hwn} - b^*_{wn})^2},$$

for n=1 ... M, m=1 ... M, and where well-mapped on-the-host color $x_{hwn}$ has L*a*b* values with coordinates {$L^*_{hwn}$, $a^*_{hwn}$, $b^*_{hwn}$} and well-mapped neighbor color $x_{wn}$ has L*a*b* values with coordinates {$L^*_{wn}$, $a^*_{wn}$, $b^*_{wn}$}.

8. The method of claim 6, wherein distance $d_{\alpha k}$, comprises:

$$d_{\alpha k} = [(L^*_\alpha - L^*_{wk})^2 + (a^*_\alpha - a^*_{wk})^2 + (b^*_\alpha - b^*_{wk})^2]^{1/2},$$

where $x_\alpha$ has L*a*b* values with coordinates {$L^*_\alpha$, $a^*_\alpha$, $b^*_\alpha$} and $x_{wk}$ has L*a*b* values with coordinates {$L^*_{wk}$, $a^*_{wk}$, $b^*_{wk}$}.

9. A system for mapping out-of-gamut colors to a gamut of a host device, the system comprising:
   a memory;
   a storage medium for storing data; and
   a processor in communication with the storage medium and the memory, the processor executing machine readable program instructions for performing the method of:
      retrieving from memory a total of $N_p$ seed-host pairs, each pair comprising a seed-mapped color $x_s$ and a host-mapped color $x_h$, each seed-mapped color corresponding to a node color having respective target L*a*b* values, wherein identifying said seed-host pairs comprises:
      identifying a total of $N_c$ node colors where $N_c \geq N_p$ each node color being both outside a boundary surface of a seed gamut of a seed device and outside a boundary surface of a host gamut of a host device, each node color having respective target L*a*b* values; and
      for each node color $x_j$, where j=1 ... $N_c$:
         passing the target L*a*b* values of node color $x_j$ through a seed profile of the seed device to obtain corresponding seed-mapped color $x_{sj}$;
         tracing a ray$_j$ between node color $x_j$ and seed-mapped color $x_{sj}$, a slope of ray$_j$ defining a direction of mapping $m_j$ between $x_j$ and $x_{sj}$; and
         extending ray$_j$ in the direction of mapping until ray$_j$ either intersects a boundary surface of the host gamut or intersects a boundary of the L*a*b* cube wherein the host gamut resides, the point of intersection with the boundary surface of the host gamut being host-mapped color $x_{hj}$ comprising a seed-hosted pair;
      for each of said identified seed-host pair, $x_{sj}$ and $x_{hj}$, where j=1 ... $N_p$:
         calculating a distance $d_j$ between seed-mapped color $x_{sj}$ and host-mapped color $x_{hj}$;
         comparing $d_j$ to a pre-determined threshold; and in response to $d_j$ being below the pre-determined threshold, adding the target L*a*b* values of this seed-mapped color's respective node color to a set of well-mapped color, otherwise adding the target L*a*b* values of this seed-mapped color's respective node color to a set of outlier colors;
      selecting at least one color $x_\alpha$ from the set of outlier colors;
      determining a new direction of mapping for color $x_\alpha$ using the target L*a*b* values of well-mapped on-the-host colors selected from the set of well-mapped neighbor colors; and
      mapping color $x_\alpha$ to a boundary surface of a host gamut of a host device using the new direction of mapping.

10. The system of claim 9, wherein ray$_j$ traced between $x_j$ and $x_{sj}$ comprises:

$$x = x_j + m_j i,$$

$$m_j = \frac{1}{\sqrt{(L^*_{sj} - L^*_j)^2 + (a^*_{sj} - a^*_j)^2 + (b^*_{sj} - b^*_j)^2}} \begin{bmatrix} L^*_{sj} - L^*_j \\ a^*_{sj} - a^*_j \\ b^*_{sj} - b^*_j \end{bmatrix},$$

where $m_j$ is the slope of ray$_j$, i is an index of the points of the line, $x_j$ has L*a*b* values with coordinates {$L^*_j$, $a^*_j$, $b^*_j$}, and $x_{sj}$ has L*a*b* values with coordinates {$L^*_{sj}$, $a^*_{sj}$, $b^*_{sj}$}.

11. The system of claim 9, further comprising, in response to ray$_j$ having intersected a boundary of the L*a*b* cube, adding the respective L*a*b* values of node color $x_j$ to the set of outliers.

12. The system of claim 9, wherein distance $d_j$ is Euclidean and comprises:

$$d_j = \sqrt{(L^*_{sj} - L^*_{hj})^2 + (a^*_{sj} - a^*_{hj})^2 + (b^*_{sj} - b^*_{hj})^2},$$

where $x_{sj}$ has L*a*b* values with coordinates {$L^*_{sj}$, $a^*_{sj}$, $b^*_{sj}$} and $x_{hj}$ has L*a*b* values with coordinates {$L^*_{hj}$, $a^*_{hj}$, $b^*_{hj}$}.

13. The system of claim 9, wherein comparing distance $d_j$ to a pre-determined threshold, comprises determining whether $d_j$ is within a defined number of standard deviations of a mean of a Gaussian distribution of distances $d_j$, the number of standard deviations being defined by said pre-determined threshold, the mean and the standard deviation comprising:

$$\mu = \frac{1}{N} \sum_{j=1}^{N} d_j,$$

$$\sigma^2 = \frac{1}{N-1} \sum_{j=1}^{N} (d_j - \mu)^2, \text{ and}$$

$$\alpha = (i \forall d_j) > (\text{Threshold} \cdot \sigma).$$

14. The system of claim 9, wherein determining a new direction of mapping for color $x_\alpha$ comprises:
   for each well-mapped color $x_{wk}$, where k=1 ... $N_w$, and $N_w$ is the number of well-mapped colors in the set of well-mapped colors, calculating, a distance $d_{\alpha k}$ between selected color $x_\alpha$ and the L*a*b* values of well-mapped color $x_{wk}$; and
   selecting a total of M well-mapped neighbor colors from the set of well-mapped colors, each well-mapped neighbor color $x_{wn}$ being in a neighborhood of colors surrounding color $x_\alpha$ as defined by $d_{\alpha k}$, each of said well-mapped neighbor colors $x_{wn}$ having a respective well-mapped on-the-host color $x_{hwn}$.

15. The system of claim 14, further comprising:

$$m_\alpha = \sum_{n=1}^{M} \frac{\left(\frac{d_{\alpha n}}{\sum_{m=1}^{M} d_{\alpha m}}\right)}{d_{hn}} \begin{bmatrix} L^*_{hwn} - L^*_{wn} \\ a^*_{hwn} - a^*_{wn} \\ b^*_{hwn} - b^*_{wn} \end{bmatrix},$$

$$d_{hn} = \sqrt{(L^*_{hwn} - L^*_{wn})^2 + (a^*_{hwn} - a^*_{wn})^2 + (b^*_{hwn} - b^*_{wn})^2},$$

for n=1 ... M, m=1 ... M, where $x_{hwn}$ has L*a*b* values with coordinates $\{L^*_{hwn}, a^*_{hwn}, b^*_{hwn}\}$ and $x_{wn}$ has L*a*b* values with coordinates $\{L^*_{wn}, a^*_{wn}, b^*_{wn}\}$.

16. The system of claim 14, wherein distance $d_{\alpha k}$, comprises:

$$d_{\alpha k} = \sqrt{[(L^*_\alpha - L^*_{wk})^2 + (a^*_\alpha - a^*_{wk})^2 + (b^*_\alpha - b^*_{wk})^2]^{1/2}},$$

where $x_\alpha$ has L*a*b* values with coordinates $\{L^*_\alpha, a^*_\alpha, b^*_\alpha\}$ and $x_{wk}$ has L*a*b* values with coordinates $\{L^*_{wk}, a^*_{wk}, b^*_{wk}\}$.

* * * * *